US006924827B1

(12) United States Patent
Gulati et al.

(10) Patent No.: US 6,924,827 B1
(45) Date of Patent: Aug. 2, 2005

(54) METHOD AND SYSTEM FOR ALLOWING A USER TO PERFORM ELECTRONIC DATA GATHERING USING FOLDABLE WINDOWS

(75) Inventors: Ashwin Gulati, San Rafael, CA (US); William J. Blackburn, Fairfax, CA (US)

(73) Assignee: ALogic S.A., Paris (FR)

( * ) Notice: Subject to any disclaimer, the term of this patent is extended or adjusted under 35 U.S.C. 154(b) by 0 days.

(21) Appl. No.: 09/473,902

(22) Filed: Dec. 28, 1999

Related U.S. Application Data

(60) Provisional application No. 60/160,639, filed on Oct. 20, 1999, and provisional application No. 60/114,065, filed on Dec. 28, 1998.

(51) Int. Cl.[7] .............................................. G09G 5/00
(52) U.S. Cl. ..................... 345/763; 345/759; 345/761; 345/778; 345/784
(58) Field of Search ................................ 345/759, 761, 345/763, 778, 784, 788, 781, 798, 797, 800, 803, 806

(56) References Cited

U.S. PATENT DOCUMENTS

| | | | | |
|---|---|---|---|---|
| 5,706,457 A | * | 1/1998 | Dwyer et al. ............... | 345/839 |
| 5,710,894 A | * | 1/1998 | Maulsby et al. ............ | 345/326 |
| 5,772,446 A | | 6/1998 | Rosen | |
| 5,999,938 A | * | 12/1999 | Bliss et al. .................. | 707/102 |
| 6,011,550 A | * | 1/2000 | Capps et al. ................ | 345/788 |
| 6,091,409 A | * | 7/2000 | Dickman et al. ........... | 345/733 |
| 6,104,401 A | * | 8/2000 | Parsons ...................... | 345/854 |
| 6,269,398 B1 | * | 7/2001 | Leong et al. ................ | 709/224 |
| 6,278,448 B1 | * | 8/2001 | Brown et al. ............... | 345/762 |
| 6,393,429 B1 | * | 5/2002 | Yagi et al. ................... | 707/102 |

OTHER PUBLICATIONS

3Com / Palm Computing: Palm VII Connected Organizer Web Clipping; *Palm Computing® connected organizers;* ©1999 3Com Corporation;1pg.

Correlate: Extending Your IT Investment; Correlate ™ *Extending Your IT Investment*; 1pg.
Product Overview; Correlate™; *Extending your IT Investment*©1999 Correlate Technologies; 1pg.
Correlate Benefits; *Extending your IT Investment*; ©1999 Correlate Technologies; 2 pgs.
Correlate Features; *Extending your IT Investment*; ©1999 Correlate Technologies; 2 pgs.
Webforia; *Webforia Organizer*; Copyright 1999 Webforia, Inc.; 2pgs.
Research Center; *Webforia Research Center,* 1999 Webforia, Inc.; 2pgs.
Organizer—Webforia; *Webforia Organizer;* Copyright 1999 Webforia, Inc.; 2pgs.
WEBFORIA, Organizer; *Capture and organize information in three easy steps*; ©Copyright 1999 Webforia Inc.; 1pg.
WEBFORIA, Organizer; *After you've found it . . . Capture it. Organize it. Use it.*
Yahoo! GeoCities Add–ons: Ad Square, Copyright 1994–1999; 3 pages.

\* cited by examiner

*Primary Examiner*—Kristine Kincaid
*Assistant Examiner*—Mylinh T Tran
(74) *Attorney, Agent, or Firm*—Reed Smith LLP; Stanley P. Fisher, Esq.; Juan Carlos A. Marques, Esq.

(57) ABSTRACT

A method and system for allowing a user to perform electronic data gathering. A data target icon floats over the other open windows and is always visible regardless of what other applications are in use. The data target icon serves as a "hotspot" for the user to save "gems" of data into a gem database. The user may, for example, drag and drop the item to be saved as a gem onto the data target icon. The data target icon serves as an entry-point into other features of a user interface. For example, by double clicking the data target icon, the user will be led to a gem toolbar. The gem toolbar can be used to access the various activities, such as a gem explorer, etc. In the described embodiment, the gem toolbar is implemented as a foldable window, in which windows are expanded in alternating orthogonal directions.

17 Claims, 20 Drawing Sheets

Research Workflow

Gathering Phase

B extends from A along the *x* axis.

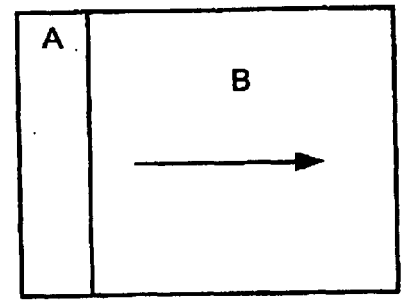
FIGURE 13A    FIGURE 13B
FIGURE 14A    FIGURE 14B

```
struct foldingWindow {
    HWND hwndFoldWin;
    HWND hwndParent;
    char* lpstrDirection;
    long lTop;
    long lLeft;
    long lWidth;
    long lHeight;
    long lMaxWidth;
    long lMaxHeight;
    long lMinWidth;
    long lMinHeight;
}
```

Fig. 18

METHOD AND SYSTEM FOR ALLOWING A USER TO PERFORM ELECTRONIC DATA GATHERING USING FOLDABLE WINDOWS

CROSS REFERENCE TO RELATED APPLICATIONS

This application claims the benefit of U.S. Provisional Patent Application Serial No. 60/114,065, "Virtual Gem", by Ashwin Gulati, filed Dec. 28, 1998, and U.S. Provisional Patent Application Serial No. 60/160,639, "Method And System For Performing Electronic Data-Gathering Across Multiple Data Sources", by Ashwin Gulati and William J. Blackburn, filed Oct. 20, 1999, which subject matter is incorporated herein by reference.

This application is related to U.S. patent application Ser. No. 09/470,855 of Gulati and Blackburn entitled "A Method and System for Performing Electronic Data-Gathering Across Multiple Data Sources." filed on Dec. 23, 1999, which is incorporated by reference herein to the extent that it contains subject matter not already incorporated by reference herein.

BACKGROUND

A. Technical Field

The present invention relates generally to electronic data-gathering, and more particularly, to allowing a user to capture, store and classify selected portions of electronic data.

B. Background of the Invention

Researching a topic using digital sources has become a time intensive process due to the vast quantity of data available. In addition, a researcher needs to track and attribute all such data used to its original source. Digital information may be collected from such varied sources as text and image files, network sources, and the Internet. The current process of collecting such data involves a complex series of interactions with the source data itself, in addition to computer-based or manual filing systems, word processors, and other authoring tools and applications that make the process non-linear and difficult to manage.

Researchers using electronic media as sources for information and documentation can archive research data using file systems or indexing software solutions. The traditional method for storing a copy of information found during research is to save the entire document into such a file system for later retrieval, or alternatively to save a relevant section of a document in a word processing or authoring type of computer application. These types of traditional computer applications for research storage include an underlying model describing the nature of the persistent data used and the functions that are available to operate on that data. The computer system will implement one or more views, typified in the modern GUI interface, allowing the user to interact with the model.

For example, a user might want to save a selected portion of information from a web page viewed using a web browser. The user could save the complete web page; however, this would not only save the relevant information but would store the entire web page. Storing the entire web page would distract future users from focusing upon the relevant information within the web page. Such storing of extraneous information is undesirable in a research environment.

The user could alternatively copy the relevant section of information from the web browser view. Next, the user would open up another application view, such as a word processing application, and paste the document segment into the application. The user would then have to save the new document as a new file. The user would also have to manually input creation and attribution information about the document into either the document itself or the file name of the document, so that the user could properly identify and attribute the information later. As used herein, creation information refers to information about the actions relating to saving the original data, such as the identity of the system user, the date and time of storage, and the source document from which the data was taken. Attribution information refers to bibliographic information such as the original author, date of publication, etc.

Currently, multiple pieces of stored electronic data are most often viewed using the application with which they were stored. A user might store entire web pages, portions of text, spreadsheet information, and graphics. Each of these types of documents could potentially be stored in a different application format. When each piece of data is later retrieved, it is necessary to open multiple different applications for data viewing, adding complexity to the process.

Traditional approaches to electronic data-gathering interrupt the workflow of a research project. For example, to save a current view, a researcher must stop interacting with the current view of the program he is using to perform his research; interact with a view of the file system browser, indexing application, or word processing application required to view stored research information; and then return to the view he was accessing before. The preferred process would be to organize such research efforts into a stream where all relevant research materials are collected from source documents at the beginning of the project. These collected materials would be processed to automatically retain creation and attribution information about the materials, and then stored for future review. Furthermore, the data stored in this phase would be visible to other researchers working on the same, or even non-related projects. Finally, the data could be withdrawn as needed, along with all proper creation and attribution information, during the compilation of the final output document.

No conventional system allows for the automatic capture, storage, and classification of less than an entire source document, including the acquisition and storage of creation and attribution metadata, packaged into a single, routable self-attributing format. Thus, there is a need for a system that will allow a researcher to acquire and use important pieces of data gleaned from electronic files of various types without stopping his or her work to interact with an additional application user-interface. Such a system would provide a conduit for inserting research data into a system model directly while negating or delaying the need to interact with a view of the system.

Various user interfaces have been used to aid in the capture and viewing of saved data. Conventional user interfaces lack flexibility and the ability to remain available, yet out of the user's way. What is needed is a user interface that can remain unobtrusive until needed, but that allows the user to view a large amount of data if the user so desires.

SUMMARY OF THE INVENTION

The electronic data-gathering system of the present invention allows a user to easily capture and archive electronic data without the need to interact with an additional application user-interface. This streamlines the workflow of performing research, and also ensures that information is easily traceable to its original source.

The described embodiments of the present invention automatically encapsulate user-selected sets of electronic data with a set of attribution, creation, and user-defined metadata. The system uses the captured data and metadata to create gem data objects. These gem data objects are then routed within the electronic data-gathering system. The gem data objects may be stored on a persistent storage mechanism, and viewed or edited by a system user.

In a described embodiment, a data target icon floats over the other open windows and is always visible regardless of what other applications are in use by a user. The data target icon serves as a "hotspot" for the user to save "gems" of data into a gem database. The user may, for example, drag and drop the item to be saved as a gem onto the data target icon. The user might also, for example, cut and paste the gem data. In addition, the data target icon serves as an entry-point into other features of a user interface. For example, by double clicking the data target icon, the user will be led to a gem toolbar. The gem toolbar also can be used to access and view the stored data. In a described embodiment, the gem toolbar is implemented as a foldable window (also called a "folding window"), in which windows are expanded in varying directions.

A more general implementation of the present invention implements foldable windows in various modes, including but not limited to two space-filling modes (simple and space-constrained modes) and a free form mode.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

FIGS. 13A–13B show an example of a window that is first expanded in a horizontal direction.

FIGS. 14A–14B show an example of a window that is first expanded in a vertical direction.

FIG. 18 shows an example data structure of a foldable window.

DETAILED DESCRIPTION OF EMBODIMENTS

Reference will now be made in detail to several embodiments of the present invention, examples of which are illustrated in the accompanying drawings. Wherever practicable, the same reference numbers will be used throughout the drawings to refer to the same or like parts.

A. System Overview

Figure 1:
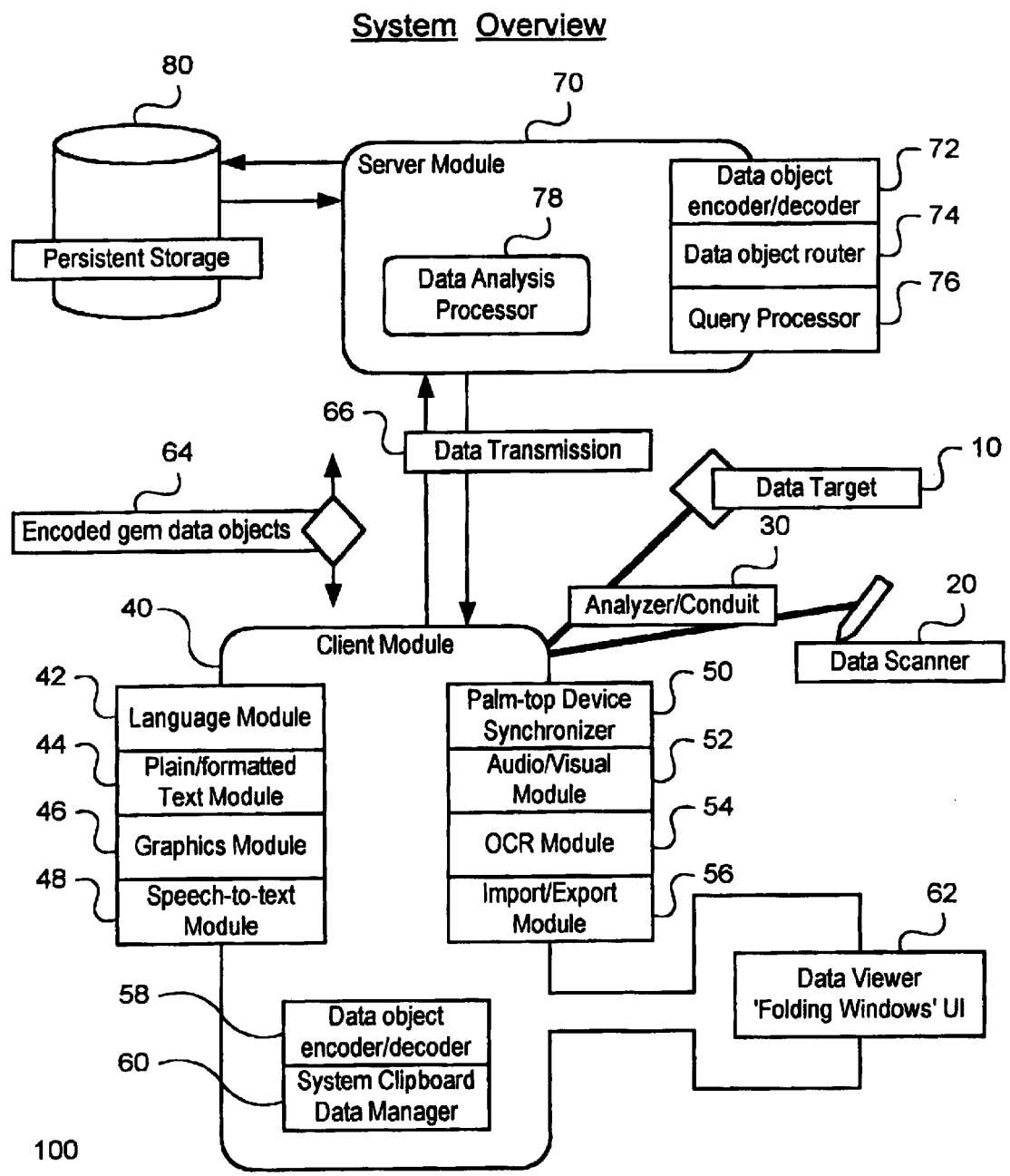
FIG. 1 is an example of an electronic data-gathering system in accordance with the present invention.

FIG. 1 is an illustration of an embodiment of an electronic data-gathering system for use in research operations. System 100 is used for creating, viewing, storing and,using encapsulated packages of electronic data and metadata. These encapsulated packages of data and metadata are referred to herein as gem data objects. It should be understood that the term "gem data object" refers not only to a Gem from the eGems™ software by Gemteq Software, Inc. but also to other types of objects. Different formats for creating, storing, and using gem data objects will be evident to one of skill in the art.

Is should be understood that the software programs described herein are stored in a memory, or on a computer readable medium, and are executed by a processor or processors, as appropriate. It will also be understood that the embodiments described herein can be implemented using any appropriate combination of hardware and/or software and that the embodiments described herein are provided for the sake of example and are not to be taken in a limiting sense.

The system of FIG. 1 is suitable for use with both data acquisition and data retrieval. First, the data acquisition functions will be discussed, followed by the data retrieval functions.

The data acquisition functions of the electronic data-gathering system of FIG. 1 will be presented by broadly tracing the path of a set of data that a user wishes to enter into the system. First, electronic data must have a point of entry into a system 100. The system 100 contains a data target 10 through which electronic data may be captured by the system 100. Alternatively, electronic data may be captured using a data scanner 20. The captured data is then passed to an analyzer/conduit 30, which receives the captured data, captures additional metadata, and passes the data and metadata to a client module 40. The metadata captured by the analyzer/conduit 30 may be any data describing or referring to the original data.

The client module 40 now contains both the original data and the captured metadata. Within the client module 40, different processing modules operate on the data and metadata to create a gem data object, an encapsulated package of data and metadata, capable of being routed throughout the system 100. Specialized modules within the client module 40 operate on the gem data object and further enhance data acquisition, storage and usage. A plain/formatted text module 44, a graphics module 46, and an import/export module 56 make up the core functionality for acquiring and using basic image and text data, as well as packaging that data for transfer between databases.

The text module 44 is responsible for processing acquired text data sets. Text data sets may be defined using a system clipboard, drag and drop activity, manual typing-in of data, speech recognition of audio data, or scanning-in of data combined with optical character recognition (OCR). Processing text data includes recognizing the type of text, displaying it in a visual component, and performing editing operations upon it.

The graphics module 46 is responsible for processing acquired image data sets. Image data sets may be defined using a system clipboard, drag and drop activity, or scanning-in of data. Processing includes recognizing the type of image, displaying it in a visual component, and performing editing operations upon it.

The import/export module 56 handles the transfer of data between databases. In one embodiment, this module resides in the client module 40, but it may also reside in the server module 70. The import/export module 56 provides for the transfer of all or part of the current system database into a new or existing database or export file, as well as the transfer of some or all of a database or import file into the current system database.

A language module 42 is capable of performing in-line language translation upon the captured data to convert from text in one language to text in another language. A speech-to-text module 48 allows for the translation of text data into audio data and vice versa. A palm-top device synchronizer module 50 allows for the acquisition of data from palm-top devices during routine synchronization procedures, which such palm-top devices are capable of performing in conjunction with another computer. An audio/visual module 52 allows for the capture, storage and retransmission of audio and video data. An optical character recognition (OCR) module 54 allows for the conversion of scanned text into editable text data. The specialized client modules shown in FIG. 1 are merely representative. Additional modules to perform specialized manipulations for gem data objects may be added to the client module 40, as will be evident to one of skill in the art.

A data viewer 62 allows the user to interact with the system 100 to manipulate raw electronic data and gem data objects in several ways. Such user interactions include, but are not limited to: capturing original data; gathering, refining, and editing gem data objects; classifying and storing gem data objects; and retrieving and using gem data objects. In one embodiment, the data viewer 62 provides a graphical user interface that displays all gem data object database information in a hierarchical format.

A data object encoder/decoder 58 packs information from the client module 40 for transporting to a server module 70. During data acquisition, the data object encoder/decoder 58 will package the newly created gem data object into a format suitable for transport. The data object encoder/decoder 58 also unpacks information received back from the server module 70. A system clipboard data manager 60 allows a user to cut and paste data. The clipboard data manager 60 handles interpreting a selected gem data object during copy and paste or drag and drop actions, and makes the selected data available to the requesting application.

After the creation and encoding of a gem data object within the client module 40, encoded gem data object 64 is sent to a data transmission module 66 for transport to the server module 70. The specific implementation of the data transmission module 66 will vary based upon the type of client/server architecture within the system 100. For example, for a local, single user installation, no transmission protocol is required, as data transmission may be done using standard in-process communication mechanisms. For a remote server module, some means of requesting data, or operations on data, and for receiving a response is required. The data transmission module 66 can therefore use any number of different data transmission protocols, which are well known in the art.

The server module 70 receives the encoded gem data objects from the data transmission module 66. The server module 70 encapsulates all data access to an underlying persistent storage mechanism 80. The server module 70 can run in or out of process with the client module 40, and can run either locally, as would be the case with a single user version of the system, or remotely, as in a client-server implementation or over the Internet, via standard protocols.

A data object encoder/decoder 72 unpacks the transmission, in this example a newly created gem data object, received from the client module 40. The server module 70 passes the transmission to a data object router 74, which processes client requests and routes data to the appropriate gem object database location. The data object router 74 may route data based upon routing information received with a transmission, or may route according to pre-set rules.

The server module 70 interacts with the persistent storage 80 to persist the data. The newly created gem data object will thus be stored in the persistent storage 80 in a gem object database. Various different embodiments of a gem object database will be evident to one of skill in the art.

The system 100 of FIG. 1 may also be used for data retrieval. Data retrieval may include, but is not limited to, retrieving individual gem data objects and performing queries for information upon the gem object database.

When using the system 100 for data retrieval, a user will input requests for information into the data viewer 62. The data viewer 62 provides a graphical user interface for viewing the contents of the gem object database and performing searches of the gem object database. In addition, the data viewer 62 provides standard graphical means (such as drag and drop or copy and paste) for organizing data via the movement, addition, and deletion of categories and gem data objects.

The client module 40 receives the request from the data viewer 62. The data object encoder/decoder 58 packages the request for transmission to the server module 70. The encoded request is transmitted to the server module 70 via the data transmission module 66. The server module 70 receives the request from the data transmission module 66, decodes it using the data object encoder/decoder 72, and submits it to a query processor 76.

The query processor 76 forms database queries based upon requests received from the client module 40 or generated locally within the server module 70. These queries are used to search the gem object database and respond to requests for database searches. The response is then encoded via the data object encoder/decoder 72 and retransmitted back to the client module 40. The client module 40 will display the request results to the user via the data viewer 62.

The query processor 76 and a data analysis processor 78 perform additional server module 70 tasks. The data analysis processor 78 analyzes the gem object database stored within the system 100 to create general profiles of system 100 users, and to create specific profiles of topics of interest within the gem object database. The data derived from these profiles may then be formed into queries. These queries may be submitted to Internet search engines as well as to the query processor 76 to provide a user with Internet sites or local files of potential interest.

The various modules disclosed with respect to FIG. 1 are merely representative. The functionality of the various different modules may be combined into a non-modular electronic data-gathering system without departing from the inventive concepts disclosed herein. Various different modules may also be combined into a single module as will be evident to one of skill in the art.

The embodiment disclosed above is implemented in software. The software is embodied in a computer readable medium, suitable for use with a computer system. Such a computer system may comprise a plurality of processors combined with a data viewscreen; however, other embodiments will be evident to one of skill in the art.

Figure 2:
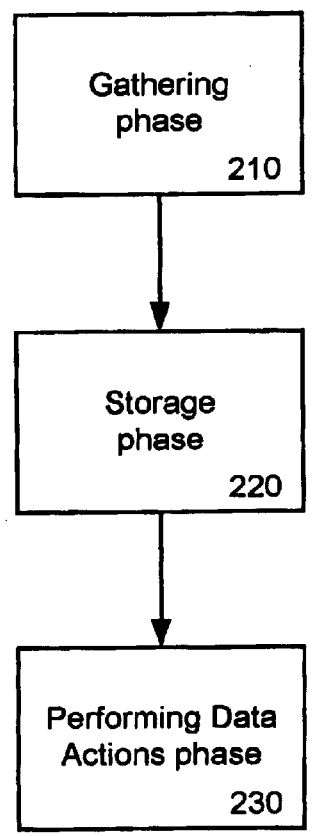
FIG. 2 is a flowchart of a research workflow method of the present invention.

FIG. 2 shows a flowchart of a research workflow method of the present invention. The method of FIG. 2 is used with the electronic data-gathering system 100 of FIG. 1 to perform research operations. During a gathering phase 210, important and relevant information is chosen and collected. Next, the information is stored in a storage phase 220. Finally, the information may be retrieved, used, and manipulated in a performing data actions phase 230. Although the process shown here is a linear one, the steps can be performed in any order. For example, a user could perform data actions upon the data before storage.

Figure 3:
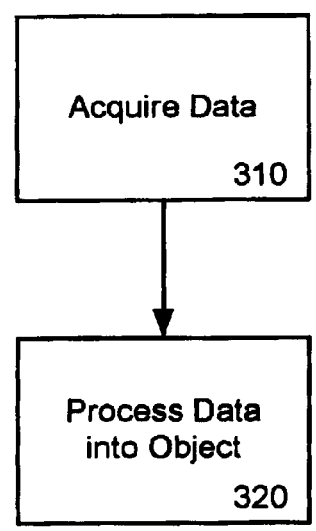
FIG. 3 is a flowchart showing an example of a gathering phase for a research workflow method.

FIG. 3 shows further details of an embodiment of the gathering phase of the research workflow method for use with an electronic data-gathering system. Data is first acquired in step 310, and then data is processed into a gem data object in step 320.

B. Gathering Phase/User Interface

Figure 4A:
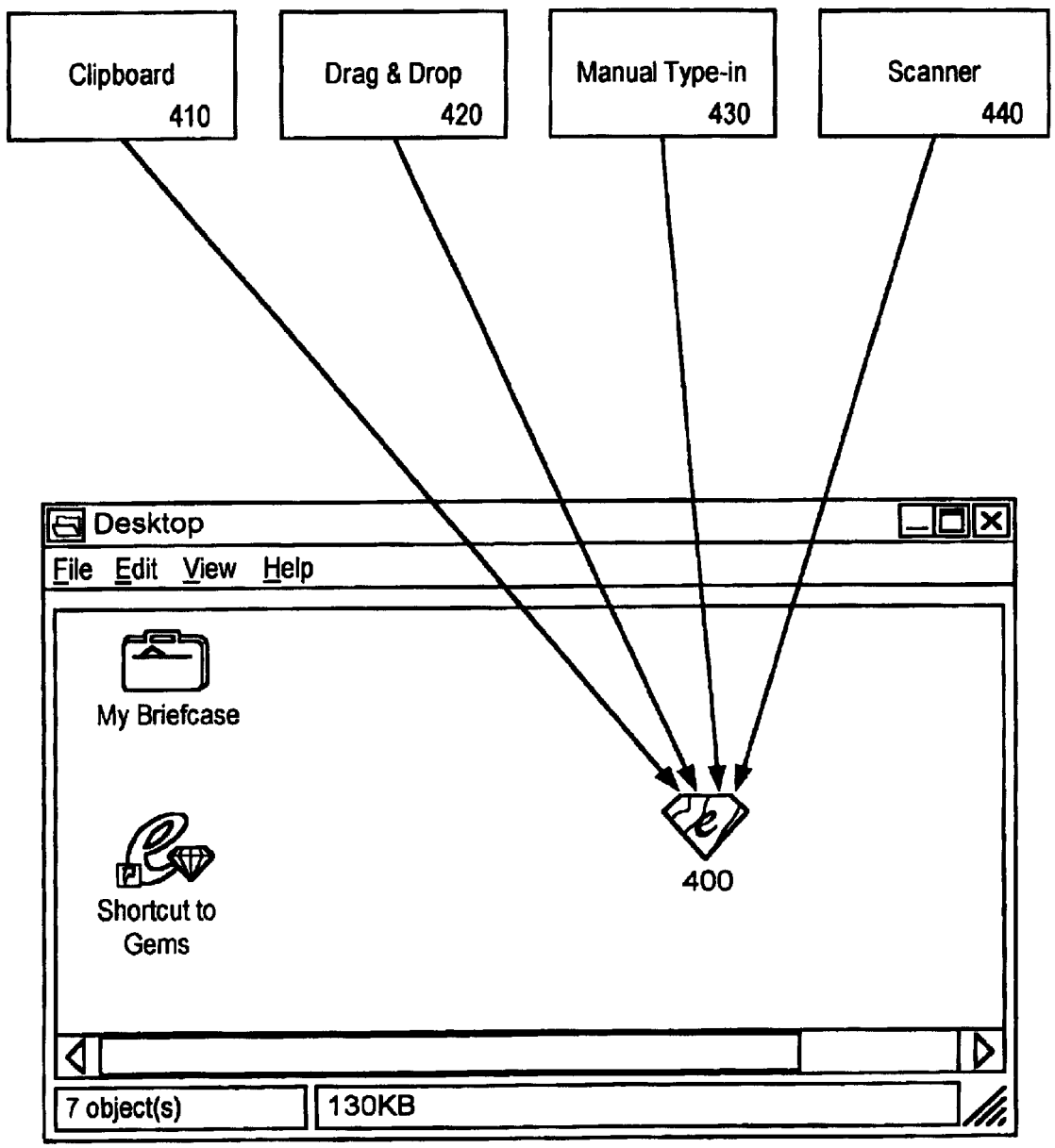
FIG. 4A is an illustration of an acquire data step using a data target as used in an embodiment of the present invention.
Figure 4B:
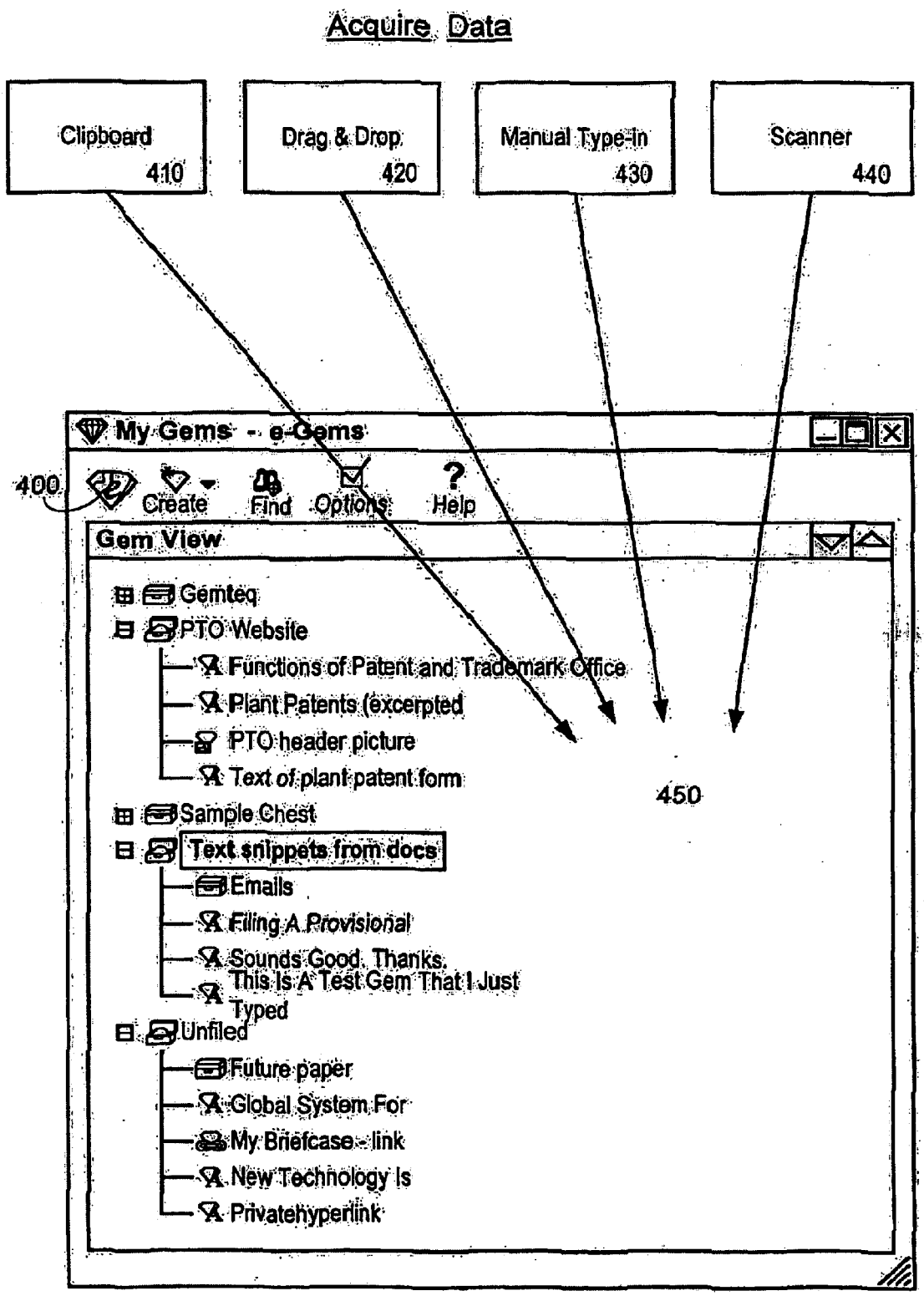
FIG. 4B is an illustration of an acquire data step using a gem data object graphical user interface view as used in an embodiment of the present invention.

FIGS. 4A and 4B show two different embodiments of the acquire data step. Four different methods of selecting data are shown: interaction with the system clipboard 410; drag and drop activity 420; manual typing-in of data 430; and electronic scanning-in of data 440. A system user may capture data electronically using any of these different methods. A user may also alternate between the different methods for selecting data as convenience dictates.

A user may capture any kind of electronic data in the acquire data step. The list of potential types of data that may be selected includes, but is not limited to: text type data, including Rich Text Format (RTF), American Standard Code for Information Interchange (ASCII) and various word-processing native formats; graphical files including Joint Photographic Expert Group (JPEG) and Graphics Interchange Format (GIF) type files; URL links; World Wide Web (WWW) pages, including Hyper Text Markup Language (HTML) files; File links; and Object Linking and Embedding (OLE) type object links.

Different types of gem data objects may be created from the data types listed above. In addition, gem data objects may be created from other types of data as will be evident to one of skill in the art. Support for additional gem data object formats may be included by coding and installing the appropriate module. There is no limit on the type and number of potentially supported formats except for the disk space and memory of the hardware platform chosen by the user.

In FIG. 4A, these four different methods of selecting data 410, 420, 430 and 440 are used to input data into a data target icon 400. The data target icon 400 is a free-floating, movable icon symbolizing the active research system. The data target icon 400 eliminates the need for a user to open and interact with additional application windows, while still allowing the user to access key features of the system. As shown in FIG. 4A, electronic data may be input directly into the data target without the need for an additional view window. In this case, the data being input is either pasted or dragged onto the data target icon 400. The data target icon 400 provides a target for inputting data into the research system, and also provides a visual indication that the electronic data-gathering system is running. The user can add data to any level of the tree structure of the research system. If data is added to data target icon 400, the data is placed at a default location in the tree.

In FIG. 4B, the aforementioned methods of selecting data 410, 420, 430 and 440 are used to input data into a data viewer window 450. In this embodiment, the data target icon 400 has been expanded to allow a view into the research system. The data viewer window 450 provides a user with an expanded view of the research system, while still allowing a user to work concurrently with other program applications.

Further details of processing selected raw data into a gem object is described in the co-pending U.S. application Ser. No. 09/470,855 Gulati and Blackburn filed on Dec. 23, 1999.

Tables 1–4 show an example of a gem data object formatting scheme. This gem data object scheme may be used to implement a client module and a server module that operate upon the gem data objects and allow users to interact with a gem object database. It should be understood that the coding and formatting scheme for implementing the electronic data-gathering system is not limited to the embodiments disclosed herein. Other formatting methods will be evident to one of skill in the art.

The gem data objects in the scheme shown in Tables 1–4 are organized in a hierarchical "tree" structure. Within the tree structure, there is a "root" node that contains the tree structure within the gem object database. All members of the tree structure are part of this root node. There are also various levels of container objects that represent inner nodes and empty nodes of the tree structure. Finally, the "leaf" nodes of the tree structure are represented by individual items, corresponding to individual gem data objects. The example structure of Tables 1–4 is directed towards a data tree that contains information about scary books.

Table 1 shows an example of a root node. A root node may contain only other containers. The root created in Table 1 is named "Examples", and becomes the root node of a tree containing examples of scary books. As given in line 1410, the server Universal Resource Identifier (URI) for this root node is "gemserver.gemteq.com." This URI allows the client and server modules to locate the root node.

TABLE 1

Root
Examples

| | |
|---|---|
| 1301 | <Root Vers="1.0" id="218838" name="Examples" mime="application/x-gemteq-root"> |
| 1302 | <rootName>Examples for example</rootName> |
| 1303 | <comments>Various things to play with that show a gem server in action |
| 1304 | <comments> |
| 1305 | <creationDate>11 Aug 1999 14:18 </creationDate> |
| 1306 | <creator> |
| 1307 | <creatorName>James Bondo</creatorName> |
| 1308 | <creatorID>jbondo</creatorID> |
| 1309 | </creator> |
| 1310 | <server>gemserver.gemteq.com</server> |
| 1311 | <modificationDate>13 Aug 1999 12:03</modificationDate> |
| 1312 | <defaultBib |
| 1313 | format="//bibserver.gemteq.com/BibilographyFormats/GenericBook"/> |
| 1314 | <objList> |
| 1315 | <!-- all are mime: application/x-gemteq-chest by definition --!> |
| 1316 | |
| 1317 | <obj id="210243234" name="ScaryBooks"> |
| 1318 | <containerName>Scary Books</containerName> |
| 1319 | </obj> |
| 1320 | <obj id="2832834" name="Various"/> |
| 1321 | <containerName>Various</containerName> |
| 1322 | </obj> |
| 1323 | <obj id="2198348" name="SallyHome"/> |
| 1324 | <containerName>Sally's Home Chest</containerName> |
| 1325 | </obj> |
| 1326 | </objList> |
| 1327 | </Root> |

Table 2 shows an example of a container node. A container node may contain other containers or individual gem data objects, or both. The container of Table 2 is named "ScaryBooks." As given in line 1509, the "ScaryBooks" container has a URI of "gemserver.gemteq.com/Examples." This URI indicates the "ScaryBooks" container is located in the "Examples" root node.

TABLE 2

Container
ScaryBooks

| | |
|---|---|
| 1401 | <Container vers="1.0" id="23444543234" name="ScaryBooks" mime="application/x-gemteq-chest"> |
| 1402 | <containerName>Some Scary Books</containerName> |
| 1403 | <comments>A collection of scary books</comments> |
| 1404 | <creationDate>11 Aug 1999 14:19 </creationDate> |
| 1405 | <creator> |
| 1406 | <creatorName>James Bondo</creatorName> |
| 1407 | <creatorID>jbondo</creatorID> |
| 1408 | </creator> |
| 1409 | <container>//gemserver.gemteq.com/Examples</container> |
| 1410 | <modificationDate>13 Aug 1999 12:03 </modificationDate> |
| 1411 | <defaultBib format="//bibserver.gemteq.com/BibilographyFormats/GenericBook"/> |
| 1412 | <objList> |
| 1413 | <obj id="210243234" name="StephanKing" mime="application/x-gemteq-tray"> |
| 1414 | <itemName> Misc </itemName> |
| 1415 | </obj> |
| 1416 | <obj id="21838848" name="DeanKoontz" mime= |

TABLE 2-continued

Container
ScaryBooks

| | |
|---|---|
| | "application/x-gemteq-tray"> |
| 1417 | <itemName>Dean Koontz</itemName> |
| 1418 | </obj> |
| 1419 | |
| 1420 | |
| 1421 | </objList> |
| 1422 | </Container> |

Table 3 shows another example of a container. The container of Table 3 is named "StephenKing." This container has a URI of "gemserver.gemteq.com/Examples/ScaryBooks", as given in line 1609. This URI indicates the "StephenKing" container is located in the "ScaryBooks" container in the "Examples" root node.

TABLE 3

Container
StephenKing

| | |
|---|---|
| 1501 | <Container vers="1.0" id="210243234" name="StephanKing" mime="application/x-gemteq-tray"> |
| 1502 | <containerName>Stephan King</containerName> |
| 1503 | <comments>A collection of books by Stephan King</comments> |
| 1504 | <creationDate>11 Aug 1999 14:19 </creationDate> |
| 1505 | <creator> |
| 1506 | <creatorName>James Bondo</creatorName> |
| 1507 | <creatorID>jbondo</creatorID> |
| 1508 | </creator> |
| 1509 | <container>//gemserver.gemteq.com/Examples/ScaryBooks</container> |
| 1510 | <modificationDate>13 Aug 1999 12:03 </modificationDate> |
| 1511 | <defaultBib format="//bibserver.gemteq.com/BibilographyFormats/GenericBook"/> |
| 1512 | <objList> |
| 1513 | <obj id="120983838" name="Carrie" mime="application/x-gemteq-textgem"> |
| 1514 | <itemName>Carrie</itemName> |
| 1515 | </obj> |
| 1516 | <obj id="65683838" name="TheStand" mime="application/x-gemteq-textgem"> |
| 1517 | <itemName>The Stand</itemName> |
| 1518 | </obj> |
| 1519 | |
| 1520 | <obj id="777983838" name="IT" mime="application/x-gemteq-textgem"> |
| 1521 | <itemName>IT</itemName> |
| 1522 | </obj> |
| 1523 | <obj id="76883838" name="PetSeminary" mime="application/x-gemteq-textgem"> |
| 1524 | <itemName>Pet Seminary</itemName> |
| 1525 | </obj> |
| 1526 | <obj id="120983838" name="TheLangoliers" mime="application/x-gemteq-textgem"> |
| 1527 | <itemName>The Langoliers </itemName> |
| 1528 | </obj> |
| 1529 | <obj id="298948393" name="MiscNotes" mime="application/x-gemteq-tray"> |
| 1530 | <itemName>Misc Notes</itemName> |
| 1531 | </obj> |
| 1532 | <obj id="298948393" name="Pic" mime="application/x-gemteq-imagegem"> |
| 1533 | <itemName>Picture of Stephan King</itemName> |
| 1534 | </obj> |
| 1535 | |
| 1536 | </objList> |
| 1537 | </Container> |

Table 4 shows an example of an individual item. The item of Table 4 is named "Carrie". As given in line 1709, this item has a URI of "gemserver.gemteq.com/Examples/ScaryBooks/StephenKing." This URI indicates the "Carrie item is located in the "StephenKing" container, in the "ScaryBooks" container, in the "Examples" root node.

TABLE 4

Item
Carrie

| | |
|---|---|
| 1601 | <Item vers="1.0" id="120983838" name="Carrie" mime="application/x-gemteq-textgem"> |
| 1602 |    <itemName>Carrie</itemName> |
| 1603 |    <comments>Psi and teenage angst. </comments> |
| 1604 |    <creationDate> 12 Aug 1999 15:20 </creationDate> |
| 1605 |    <creator> |
| 1606 |       <creatorName>Billy Joe Jim Bob</creatorName> |
| 1607 |       <creatorID>bjjbob</ceatorID> |
| 1608 |    /<creator> |
| 1609 |    <container>//gemserver.gemteq.com/Examples/ScaryBooks/StephanKing</container> |
| 1610 |    <modificationDate> 14 Aug 1999 16:20 </modificationDate> |
| 1611 |    <bib format="//gemserver.gemteq.com/BibilographyFormats/MLABook"> |
| 1612 |       <author>Stephan King</author> |
| 1613 |       <publicationTitle>Carrie</publicationTitle> |
| 1614 |       <publisher>Random House</publisher> |
| 1615 |       <location>New York</location> |
| 1616 |       <ed> 3 </ed> |
| 1617 |       <vol>1 </vol> |
| 1618 |       <date> 2 Aug 1978 </date> |
| 1619 |       <pageStart>21</pageStart> |
| 1620 |       <pageEnd>43</pageEnd> |
| 1621 |       <url>http://www.misclocation.com/some/path/doc.html</url> |
| 1622 |    /bib> |
| 1623 |    <!-- an image may have the following attributes |
| 1624 |      datamime="image/jpg" |
| 1625 |      compression="application/x-zip" |
| 1626 |      encoding="application/uuencode" |
| 1627 |    --!> |
| 1628 |    <data mime="text/plain" compression="" encoding=""> |
| 1629 |       Carrie was just a normal girl. With an wonderful mother |
| 1630 |       and really good friends. For some reason she got very |
| 1631 |       angry when they dumped a bucket of goo upon her at the prom. |
| 1632 |    </data> |
| 1633 | </Item |

A client would use the above example of a tree structure to find and route gem data objects. For example, the client module 40 would parse the URI of the "Carrie" item shown in Table 4 in the following way. The server module 70 would be indicated as "gemserver.gemteq.com". The data tree would be given by the root node "Examples". The path would be given by the two container nodes "ScaryBooks/StephenKing". The actual gem data object would be the item "Carrie."

In an XML-based embodiment, using this path information, the client module 40 would make a RPC to the server module 70 using standard HTTP protocols to request the "Carrie" gem data object. The server module 70 would then reply with a standard HTTP response that contains the XML-RPC response that in turn contains the "Carrie" gem data object requested. The XML portion of the response may be of many different types to represent the success or failure of the RPC call.

The embodiment of a gem data object "Carrie" as shown in Table 4 demonstrates that a gem data object is an encapsulation of the original electronic data combined with creation, attribution, and user-selected metadata. Line 1703 of the "Carrie" gem data object contains user-selected comments about the gem data object. Lines 1704–1710 of the "Carrie" gem data object contain metadata about the creation of the original gem data object: when the gem data object was created (line 1704); who created the gem data object (lines 1705–1708); and when the gem data object was modified (line 1710). Lines 1711–1722 contain attribution metadata as well as information about how a bibliography for the "Carrie" gem data object should be formatted. For example, line 1711 gives the bibliography format "MLABook", which corresponds to one of the bibliography format choices from the popup menu 924 of FIG. 9B.

The original data for the gem data object "Carrie" is also shown in Table 4. Lines 1729–1731 list the text data that is encapsulated with the metadata listed above. The example "Carrie" is a text type of gem data object. However, a variety of other types of gem data objects are also available.

Several different types of gem data objects can be created and viewed. The overall structure for a gem data object is preferably substantially the same regardless of the type of original data contained in the gem data object. Examples of data types that may comprise the original data have been discussed previously with regard to FIGS. 4A and 4B. Each type of gem data object will contain the original data encapsulated with creation, attribution, and user-selected metadata. This allows for consistency in the use of gem data objects, and also allows new types of gem data objects to be easily incorporated into the gem object database. It will be evident to one of skill in the art that various other types of gem data objects may be created, stored, and manipulated within the electronic data-gathering system. Types of gems include text, link, OLE object, picture (including JPEG and GIF formats), and URL.

A gem data object is an implementation of the encapsulated original data and metadata along with the functionality required to use, view, and manipulate the captured data. The gem data object is a single shareable package of data and metadata. This gem data object package is a "self-attributing" unit—it contains bibliographic information as well as information about how an appropriate bibliography, footnote, or caption should be formatted. This enables the gem data object to generate its own bibliography or other identifying caption about itself.

Figure 4C:
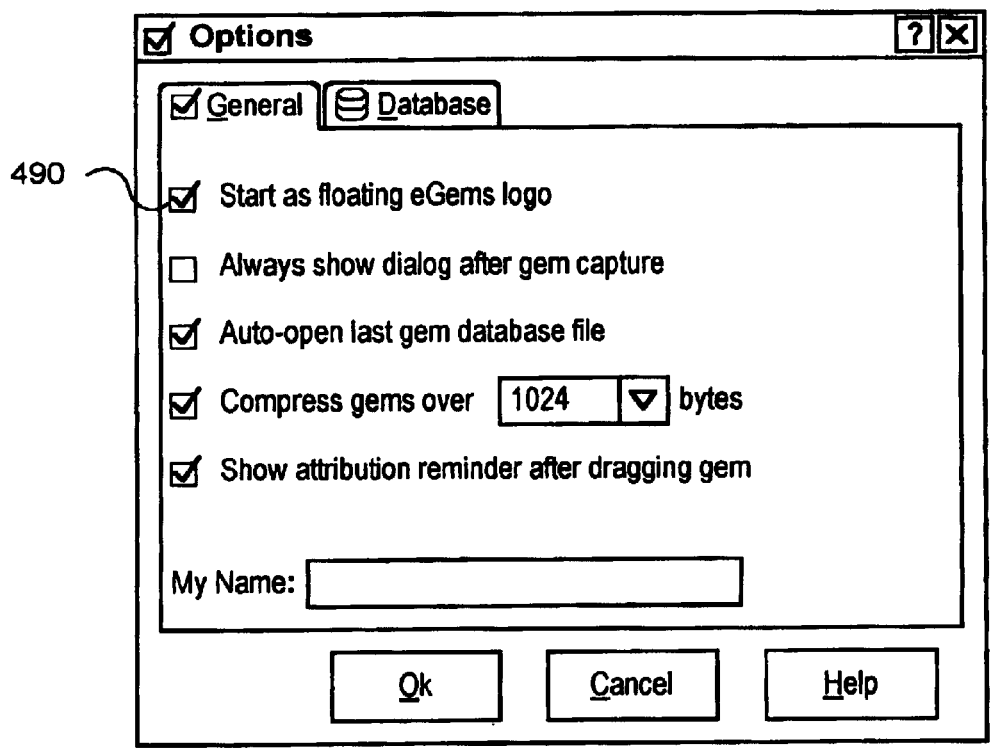
FIG. 4C is an illustration of an options window for the system shown herein.

FIG. 4C is an illustration of an "options" tab that allows the user to set various options for the user interface defined herein. Specifically, check box 410 allows the user to specify that, upon beginning execution, only the data target icon 400 should be displayed. If this box is not checked, the system will begin execution by opening a window, such as the gem view window shown in FIG. 4B.

C. Data Viewing/User Interface

In a preferred embodiment of the system described above, the user interface employs foldable windows and a data target icon. The data target icon allows the user to retain access to the input/gathering functions of the system but does not block the user's view of whatever other windows he may have open on the display device. Foldable windows allow the user to control the amount of space used by display windows and to control the amount and type of information displayed.

The described embodiment allows the user to interact with the system in any of several actions: gathering/refining/editing data; classifying and storing data; and retrieving and using data. These actions access subroutines in the client modules and its sub-modules, and may involve additional calls to the server module to satisfy requests to add, edit, or delete data items.

In conventional pop-up windows, new information is presented to the user as a new window on top of the old window. In contrast, foldable windows display information in a new window next to or near the old window. This allows the user interface designer to add and subtract data from the display in a consistent and non-distracting manner. The visual method by which windows are added and subtracted from the display differs in various embodiments. For example, in some embodiments, an animation of a sliding window or an animation of a window "folding" out from behind the existing window may be used when a window is expanded. In other embodiments, the new window may simply appear next to the window that was expanded.

New windows can be added along alternating axes on the display device. For example a first window may be added in a horizontal direction, a second in a vertical direction, and so on. The first direction can be predetermined (or user determined) to be either horizontal or vertical, in either an up/down or left/right direction. When a window is removed (collapsed), it is removed along the same axis by which it was created.

Figure 5A:
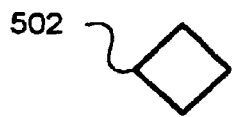
FIG. 5A is an illustration of a data target icon that is not being displayed in a window.

FIG. 5A is an illustration of a data target icon that is not being displayed in a window. Another example of such a target data icon is shown as gem icon 400 in FIG. 4A. This icon preferably is displayed on top of any open windows, allowing the user access to the gem system described herein even when the user is using other programs. The data target icon performs a dual role: it allows the user to gather data (by dragging and dropping or cutting and pasting, for example). It also allows the user to view and edit the data be providing access to additional windows, such as the foldable windows shown in FIGS. 5B-7.

Figure 5B:
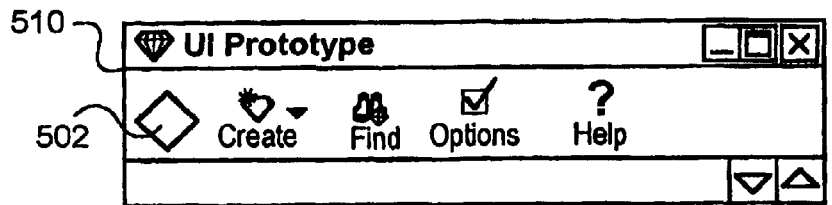
FIG. 5B is an illustration of a toolbar created by expanding the data target icon of FIG. 5A.

FIG. 5B is an illustration of a toolbar 510 created by expanding the data target icon 502 of FIG. 5A. In the described embodiment, toolbar 510 is created under software control when the user double clicks on data target icon 502, although any appropriate user indication can be used. In the described embodiment, data target icon 502 acts as a toggle. Double clicking on the icon 502 when toolbar 510 is open will cause the toolbar to close and only the floating data target icon 502 to be displayed.

Tool bar 510 includes menus for creation functions, a find function, options function (see FIG. 4C), and a help function. Toolbar 510 can include any other appropriate functions, or fewer functions than described here. Create functions include, but are not limited to create new gem; create new gem by capturing the current active window; create new gem from clipboard; create full screen gem; create new chest; and create new tray.

Figure 5C:
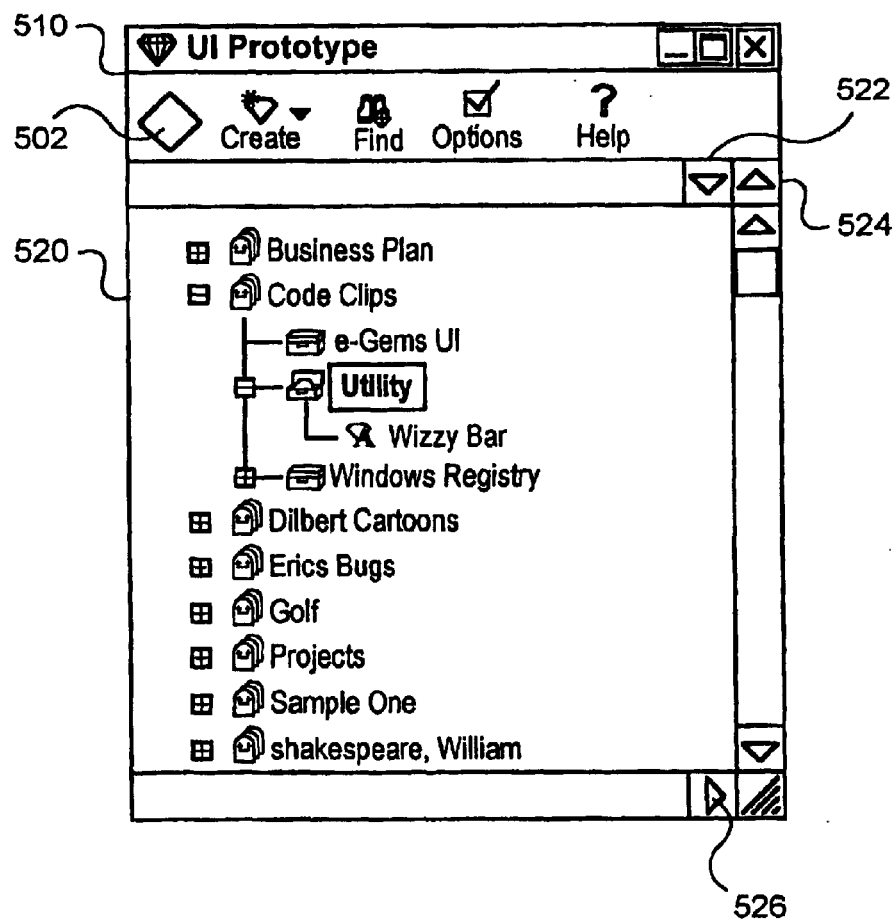
FIG. 5C is an illustration including a gem view window created by expanding the toolbar of FIG. 5B.

FIG. 5C is an illustration including a gem view window 520 created by expanding toolbar 510. Gem view window 520 includes a hierarchy of gem objects, as described in further detail in connection with FIG. 8 below. In the described embodiment, gem view window 520 is created under software control when the user clicks on down arrow 522, which is active in the toolbar (although any appropriate user indication of expansion can be used). In the described embodiment, data target icon 502 in the gem view window acts as a toggle. Double clicking on the icon 502 when gem view window 520 is open will cause toolbar 510 and gem view window 520 to close and only the floating data target icon 502 to be displayed. If the gem widow is closed to display only data target icon 502, clicking on the data target icon 502 again will cause toolbar 510 and gem view window 520 to reappear (i.e., the windows that were open before will be reopened).

When gem view window 520 is open, up arrow 524 is active. When the user clicks on up arrow 524 (or otherwise indicates contraction), the gem view window 520 is closed (contracted), leaving only toolbar 510. Thus, toolbar 510 is a foldable window that can be expanded vertically to yield gem view window 520. Similarly, gem view window 520 can be contracted vertically to yield toolbar 510. Thus, toolbar 510 is expanded from and contracted to using the same vertical axis.

Figure 6A:
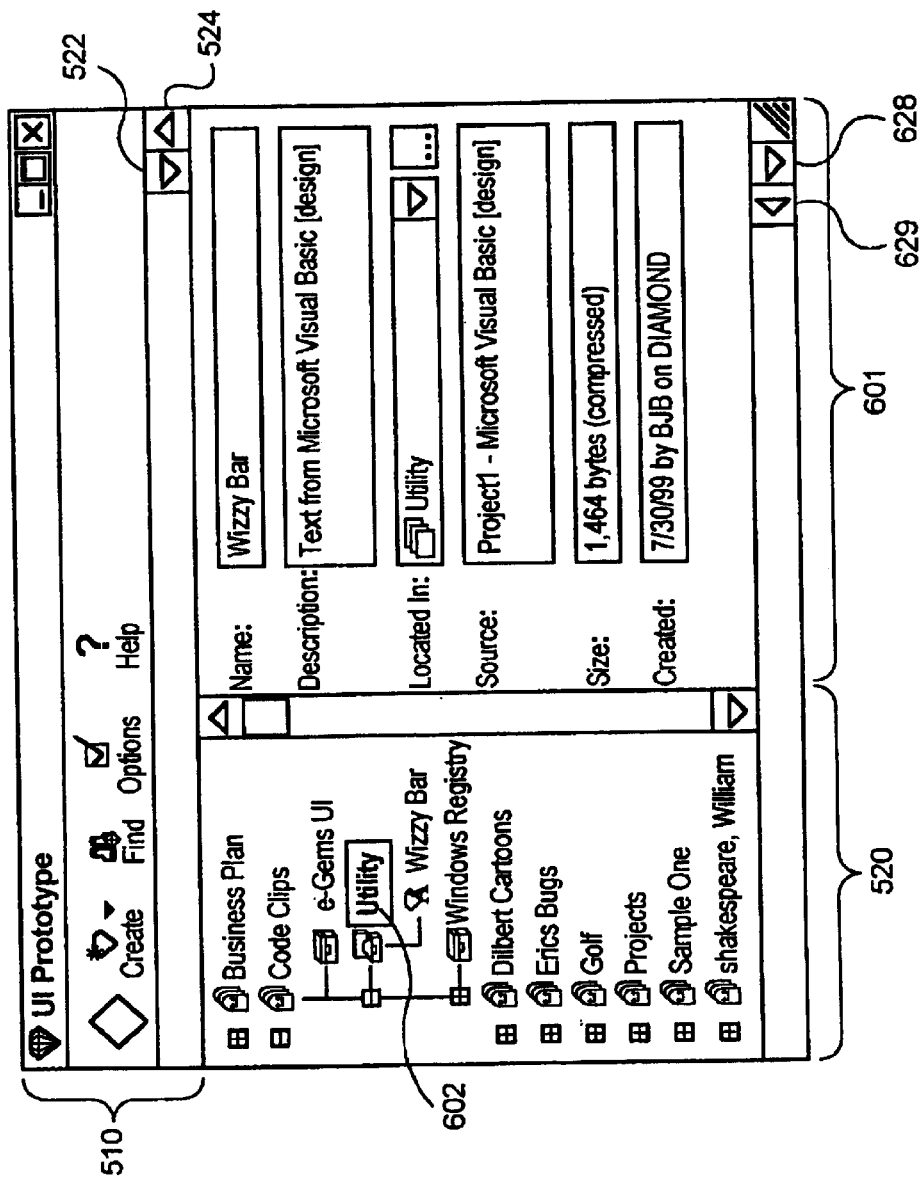
FIG. 6A is an illustration including a detail view of a gem created by expanding an item in the gem view window of FIG. 5C.

FIG. 6A is an illustration of a detail view of a window 601 for a selected gem 602 named "wizzy bar." Window 601 was created by expanding gem view window 520. Window 601 includes information about the selected gem, as described in further detail in connection with FIG. 8 below. In the described embodiment, window 601 is created under software control when the user double clicks on right-pointing arrow 526, which is active in gem window 520 of FIG. 5C (although any appropriate user indication of expansion can be used). In the described embodiment, data target icon 502 in the gem view window acts as a toggle. Double clicking on the icon 502 when window 601 is open will cause the windows 510, 520, and 601 to close and only the floating data target icon 502 to be displayed. If the widow 601 is closed to display only data target icon 502, clicking on the data target icon 502 again will cause the windows 510, 520, and 601 to reappear (i.e., the windows that were open before will be reopened).

In other embodiments, clicking on right-pointing arrow 526 of FIG. 6C might cause other windows relating to selected gem 602 to expand. For example the expanded window might contain information such as that shown in FIGS. 9A or 9B. Alternately, windows containing this information can be opened as separate expanded windows (not shown). Alternately, the user can be allowed to select (via, e.g., an option list) what type of information about a gem to display in window 601.

When window 601 is open, left-pointing arrow 629 is active. When the user clicks on left-pointing arrow 629 (or otherwise indicates contraction), window 601 is closed (contracted), leaving gem view window 520 (and toolbar 510, which will be shorted to its previous length). Thus, gem window 520 is a foldable window that can be expanded horizontally to yield window 601. Similarly, window 601 can be contracted horizontally to yield gem view window 520. Thus, gem view window 520 is expanded from and contracted to using the same horizontal axis.

Figure 6B:
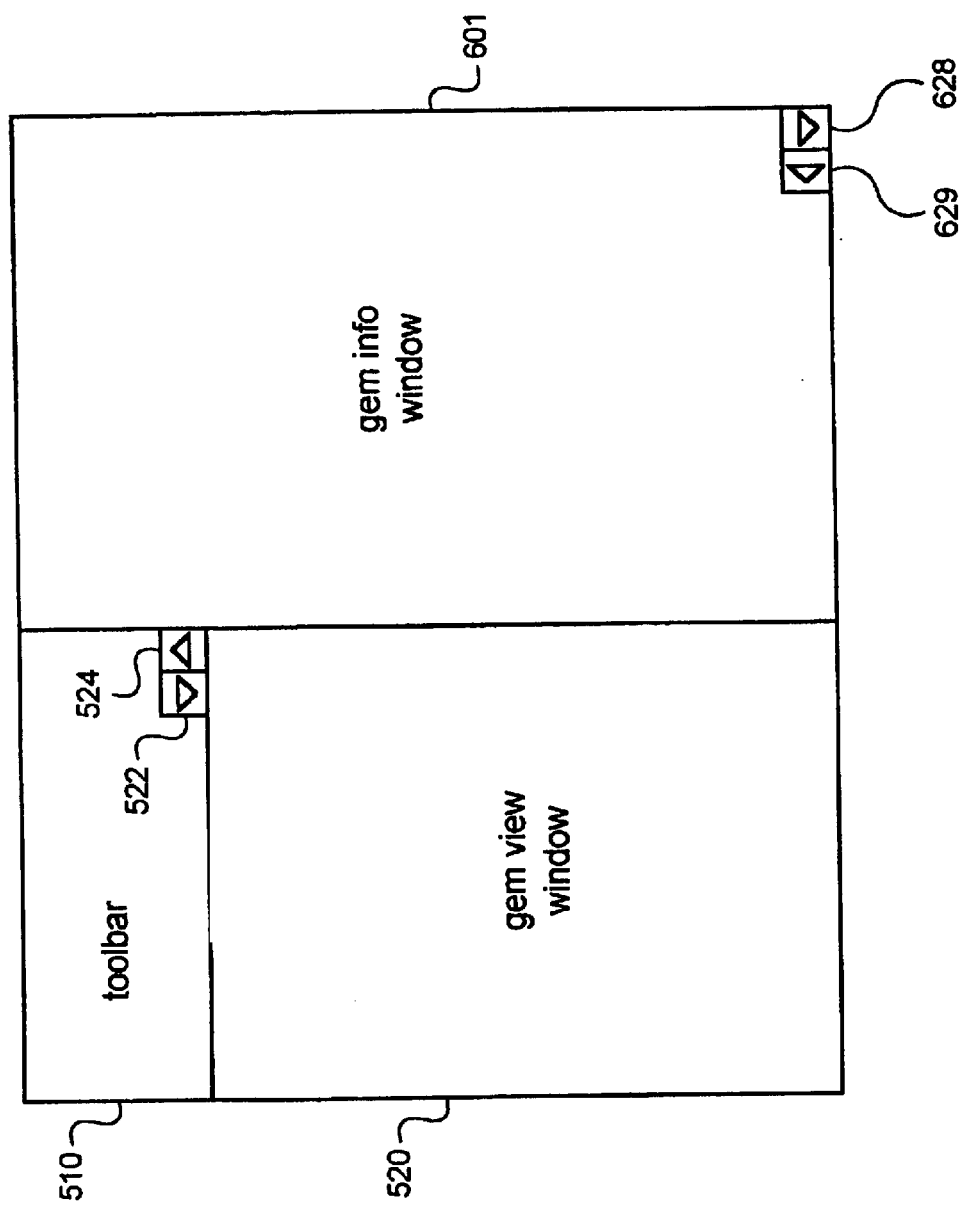
FIG. 6B is an illustration including a second embodiment of a detail view of a gem created by expanding an item in the gem view window of FIG. 5C.

Note that, in the example of FIG. 6A, when gem view window 520 is expanded, toolbar 510 is expanded to fit across the top horizontally. In another embodiment, as shown in FIG. 6B, window 601 is expanded to be the same height as the combined height of toolbar 510 and gem view window 520.

Figure 7:
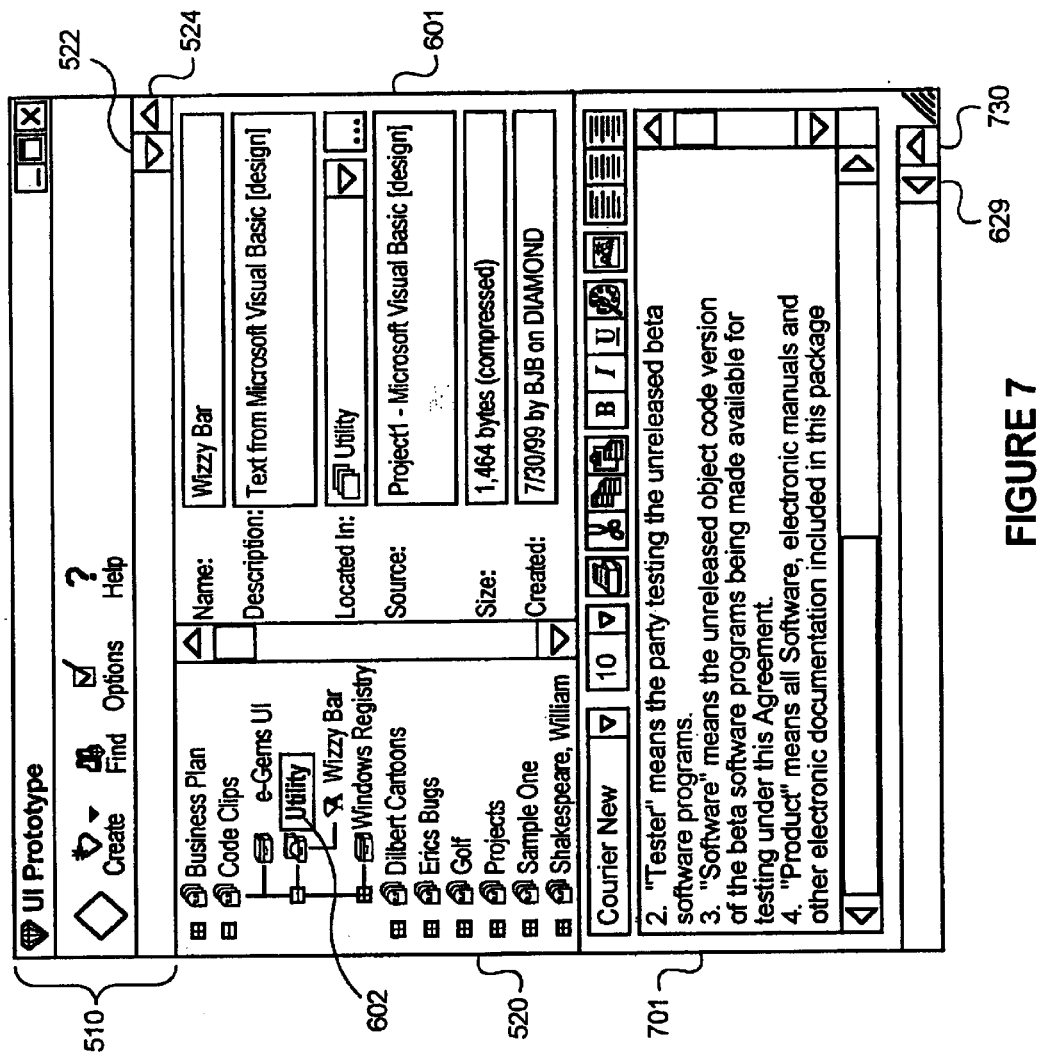
FIG. 7 is an illustration including an editing area created by expanding an item in the detail view of FIG. 6A.

FIG. 7 is an illustration including an editing area window 701 created by expanding window 601 of FIG. 6A. Window 701 includes information contained in the selected gem 602, as described in further detail in connection with FIG. 10 below. In the described embodiment, window 701 is created under software control when the user double clicks on down arrow 628, which is active in the window 601 of FIG. 6A (although any appropriate user indication of expansion can be used). In the described embodiment, data target icon 502 in the window 701 acts as a toggle. Double clicking on the icon 502 when window 701 is open will cause the windows 510, 520, 601 and 701 to close and only the floating data target icon 502 to be displayed. If the widow 601 is closed to display only data target icon 502, clicking on the data target icon 502 again will cause the windows 510, 520, 601, and 701 to reappear (i.e., the windows that were open before will be reopened).

When window 701 is open, up arrow 730 is active. When the user clicks on up arrow 730 (or otherwise indicates contraction), window 701 is closed (contracted), leaving windows 520 and 601 (and toolbar 510). Thus, window 601 is a foldable window that can be expanded vertically to yield window 701. Similarly, window 701 can be contracted vertically to yield window 601. Thus, window 601 is expanded from and contracted to using the same vertical axis.

Note that, in the described embodiment, only a single expansion arrow and a single contraction arrow are active at any given time. Thus, a series of expanded windows can be contracted by the user, one by one, in a reverse order from the order in which they were opened.

In other embodiments, more than one expansion and contraction arrow can be active at once. Thus, windows can be expanded and contracted as groups. For example, if in FIG. 7, the user clicks on contraction/up arrow 524, the three windows 520, 601, and 701 would all be closed under program control, leaving only toolbar 510. Having more than one contraction arrow active allows the user to quickly close expanded windows, but may be more confusing for certain users.

D. Display of Gem Information

Figure 8:
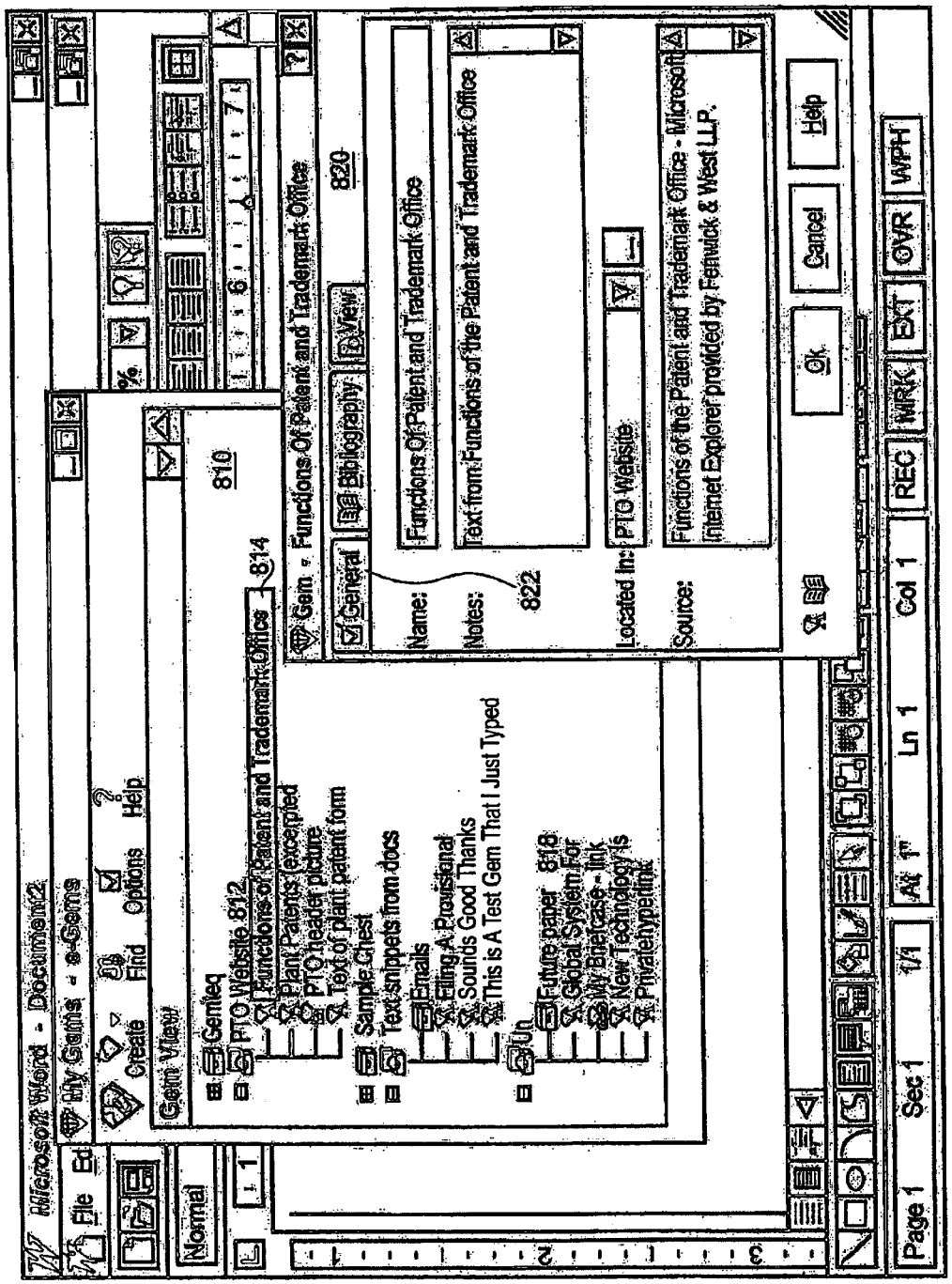
FIG. 8 is a diagram showing an example of a user interface window for a gem data object viewer with a "General" tab of the popup menu of a gem data object expanded.
Figure 9A:
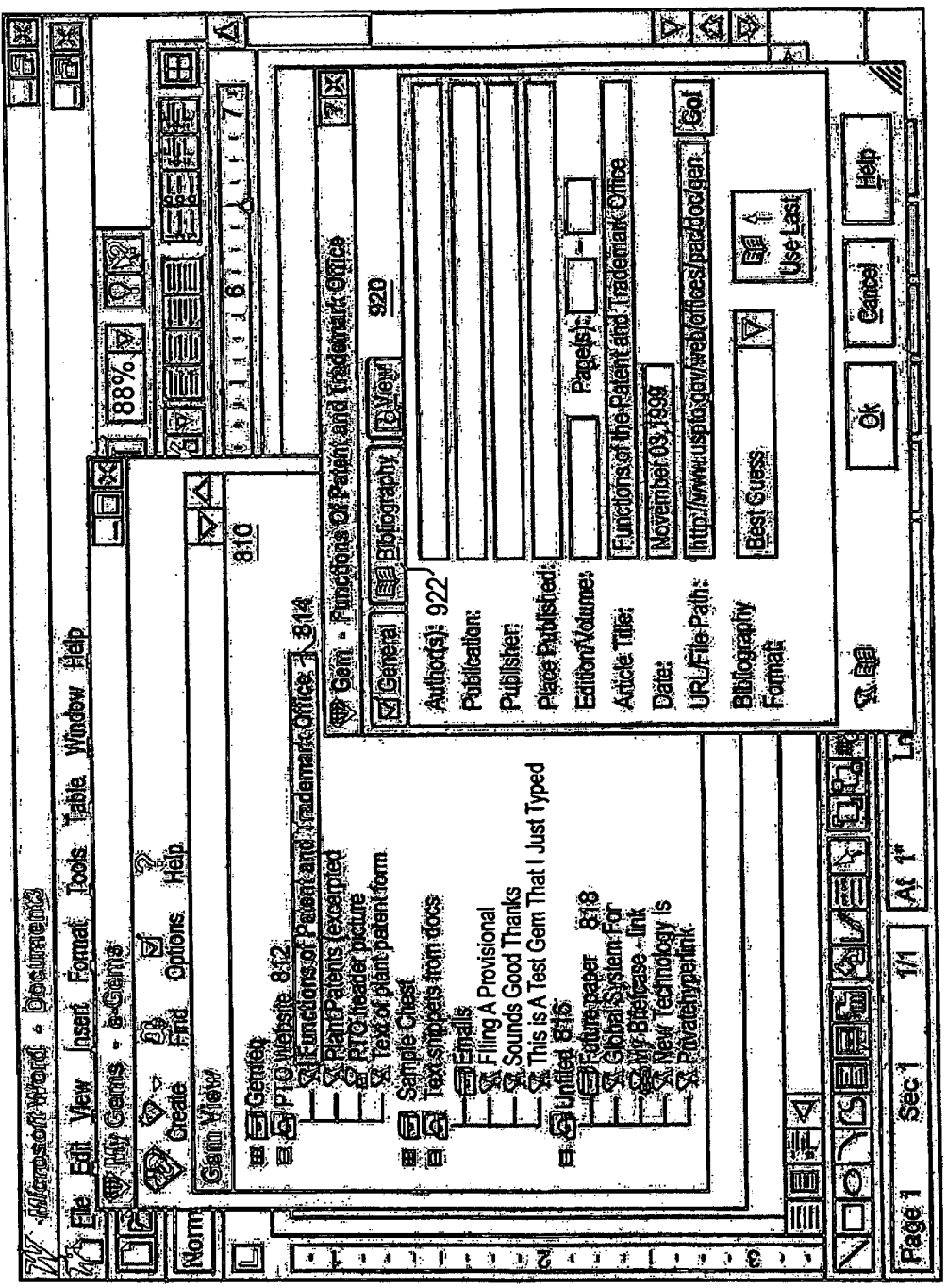
FIG. 9A is a diagram showing an example of a user interface window for a gem data object viewer with a "Bibliography" tab of the popup menu of a gem data object expanded.
Figure 9B:
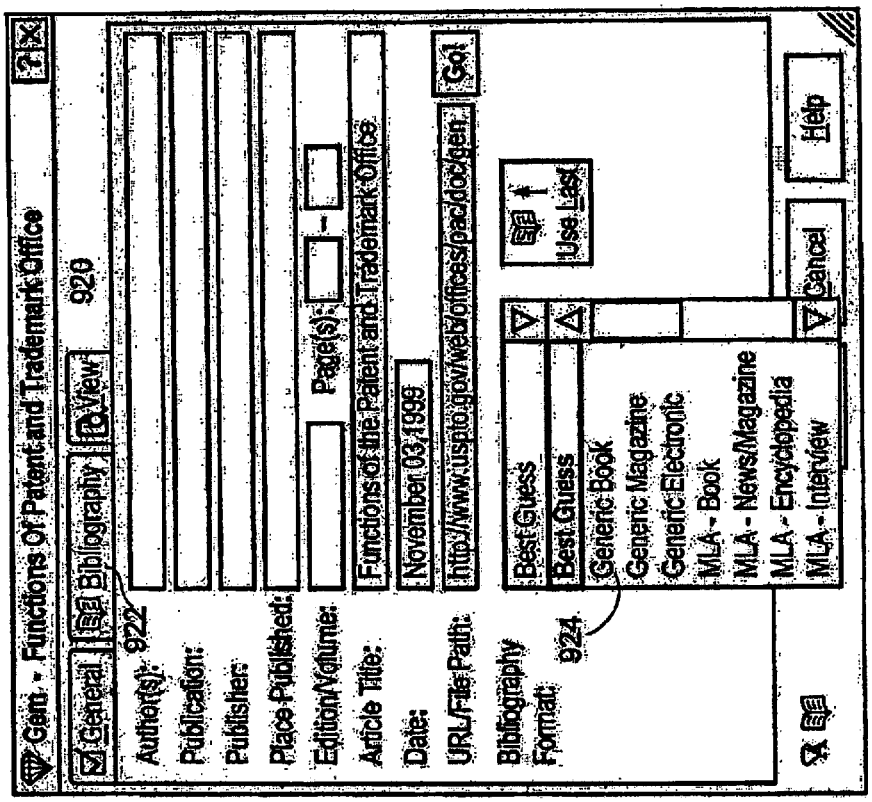
FIG. 9B is a diagram showing an example of the "Bibliography" tab of the popup menu of a gem data object expanded, with a scrolling menu displayed for the "Bibliography Format" option.
Figure 10:
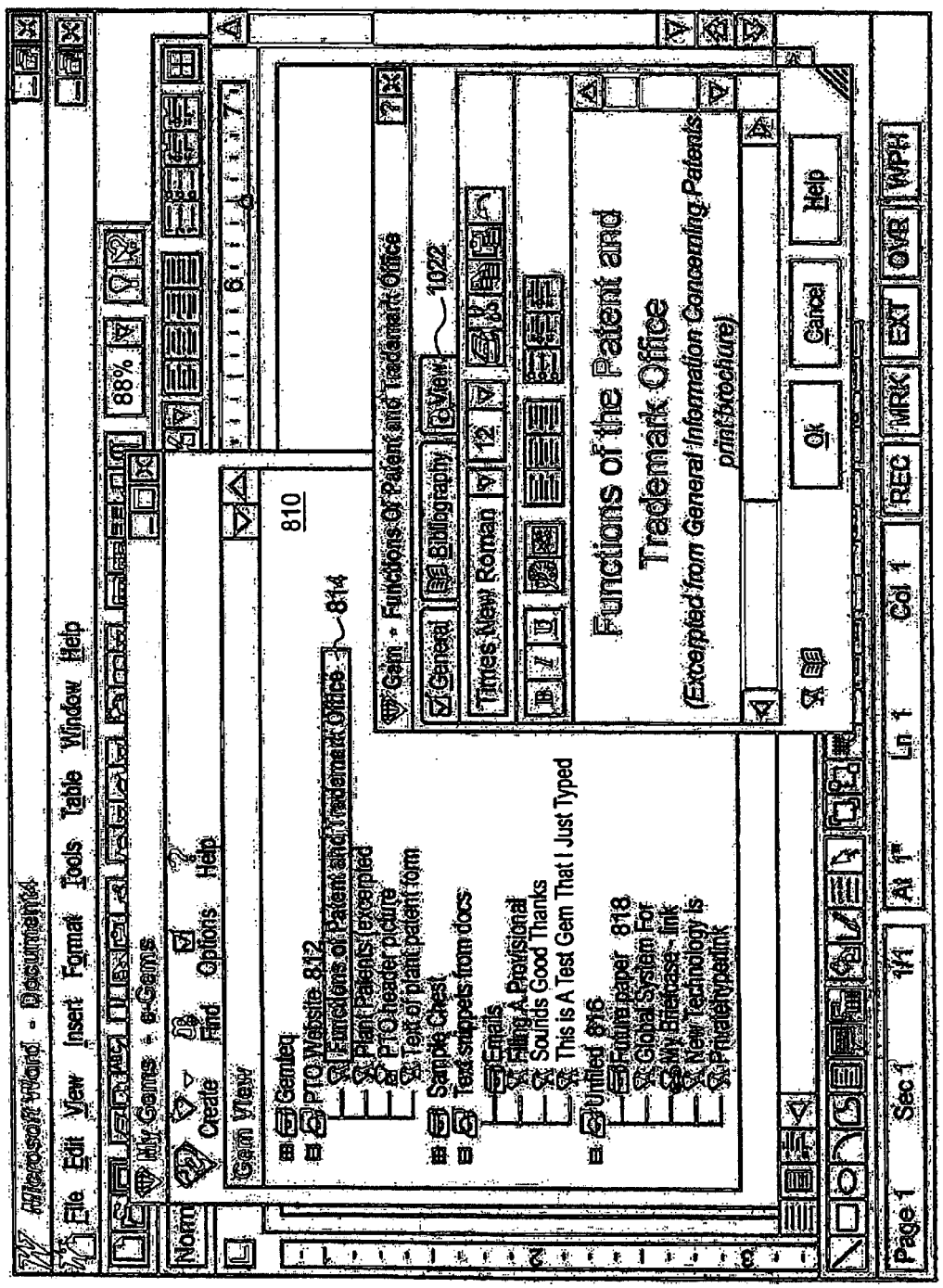
FIG. 10 is a diagram showing an example of a user interface window for a gem data object viewer with the "View" tab of the popup menu of a gem data object expanded.

FIGS. 8, 9, and 10 are diagrams showing an embodiment of a user interface for the electronic data-gathering research system that use some of the foldable windows shown above, but that display the detail view and editing area in separate windows. The user interface provides one or more views into the research system model and displays information about the gem data objects within the system. The views also provide a user interface for adding, modifying, or deleting the original data or metadata encapsulated by the gem data object. The windows shown in FIGS. 8, 9, and 10 are merely representative of the type of information that may be displayed to describe a gem data object.

In FIG. 8, a window 810 shows a "Gem View" window providing a hierarchical view of the stored gem data objects within the system. The individual gem data objects may be organized in a hierarchical manner by grouping them into containers. Each container is a grouping of individual gem data objects, or a grouping of containers. This hierarchical storage method provides a convenient way for a user to organize the gem data objects within the research system. For example, in the window 810, "PTO Website" constitutes a container 812, while "Unfiled" constitutes another container 816. A gem data object "Functions of Patent and Trademark Office" 814 is stored in the container 812, while a gem data object "Future paper" 818 is stored in the container 816. In this example, gem data object "Functions of the Patent and Trademark Office" 814 has a data type of "text".

A window 820 shows an expanded view of a popup window for the gem data object "Functions of Patent and Trademark Office" 814. A "General" tab 822 of the popup window 820 has been selected. The tab 822 displays information regarding the gem data object's name and descriptive notes regarding the gem data object. The tab 822 also displays the container in which the gem data object is located, as well as information about the original source application for the data contained in the gem data object. Tab 822 provides a user interface for viewing, adding, deleting, or modifying the displayed information regarding a gem data object.

FIG. 9A contains the same window 810 showing a "Gem View" window providing a hierarchical view of the stored gem data objects within the system as shown in FIG. 8. However, in FIG. 9A a popup window 920 for the gem data object 814 has a "Bibliography" tab 922 selected. The tab 922 displays bibliographic information regarding the original source data, such as: the author's name; publication; the place published; the edition or volume; and the page numbers. The tab 922 also displays the original article title and date of publication, as well as the URL of the source document. Tab 922 provides a user interface for adding, deleting, or modifying the displayed information regarding a gem data object.

FIG. 9B shows a second view of the popup window 920 with the "Bibliography" tab 922 selected. In FIG. 9B, a scrolling menu 924 is displayed for the "Bibliography Format" option. The scrolling menu 924 allows a user to select from various different types of standard bibliographic formats for citing printed and electronic resources. The bibliography format field of the gem data object contains an integer value code representing the chosen type of bibliography format.

The bibliography entry itself is composed "on-the-fly" when requested by the user. The user can request the insertion of a bibliographic entry, footnote, or other type of caption by using drag and drop or copy and paste interactions. Once requested, a method of the gem data object is invoked wherein the format code is evaluated. The data fields corresponding to source information (such as author, publication, etc.) are then strung together using the appropriate formatting (such as italics, quotation marks, etc.) and made available to the target application via the system clipboard.

FIG. 10 contains the same window 810 showing a "Gem View" window providing a hierarchical view of the stored gem data objects within the system as shown in FIGS. 8 and 9A. However, in FIG. 10 a popup window 1020 for the gem data object 814 has a "View" tab 1022 selected. The tab 1022 provides a view of the original captured data. Tab 1022 also provides a user interface for adding, deleting, or modifying the data contained in the gem data object. In the example shown, the user can perform standard editing operations such as changing the font, cutting and pasting, justifying the text, etc.

E. More Examples of Foldable Windows

FIGS. 11–17 show additional examples of ways of expanding foldable windows that can be used in the windowing system described above. It will be understood that foldable windows can be used in a wide variety of systems and that the foldable windows (and data target icons) shown herein are not limited to the system shown.

In general, foldable windows can be any size and shape. As an example, FIGS. 11A–11D and 12A–12C show series of expanded windows starting using the same expansion scheme, but starting with differently shaped windows. Windows in certain embodiments can be sized by the user (e.g., using a known Windows drag operation). Sizing preferably can occur either before or after expansion of one or more of the windows. In the described embodiments, if a window is sized, then all other windows in the expanded windows will also be sized if needed. For example, if window 701 in FIG. 7 is sized by a user, then one or more of windows 510, 520, and 601 will also be sized automatically so that the windows still form a rectangular area.

The examples shown expand downward and to the right. Other embodiments may expand upwards and/or to the left. Still other embodiments may expand on an axis that is neither vertical nor horizontal, but that is at an angle in between. Still other embodiments may represent three-dimensional expansion and contraction of windows or other objects, either in 2D or in 3D representations. For example, a 2D representation of a cube may expand in three dimensions.

In the following examples, the order of expansion is shown by the number of arrows in a window. The first expansion window has one arrow, the second expansion window has two arrows, and so on. The directions of the arrow(s) indicate the direction in which the window containing the arrow was expanded. It will be understood that all windows in these examples contain information (not shown for clarity) and contain user interfaces, such as expansion/contraction arrows, to allow a user to indicate that he wishes to expand or contract a window.

i) Simple Foldable Windows

Figure 11A:
FIGS. 11A–11D show an example of a simple foldable window.
Figure 11B:
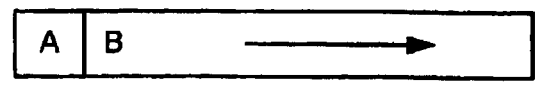
Figure 11C:
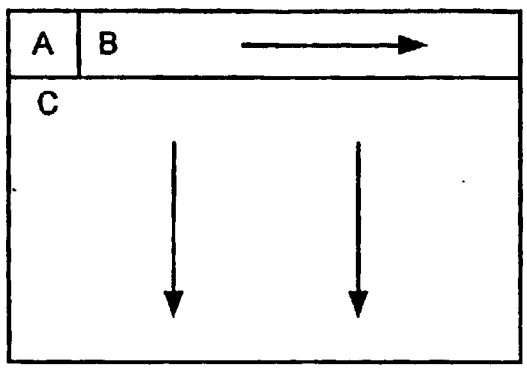

FIGS. 11A–11D show an example of a simple foldable window mode. FIG. 11A shows a window A. In FIG. 11B, a user has indicated that window A is to be expanded and a computer program has expanded window A in a right, horizontal direction along a horizontal axis. As shown in FIG. 11C, when more information needs to be shown, the user window C is preferably created along an axis that is orthogonal to the axis along which B was extended.

Figure 11D:
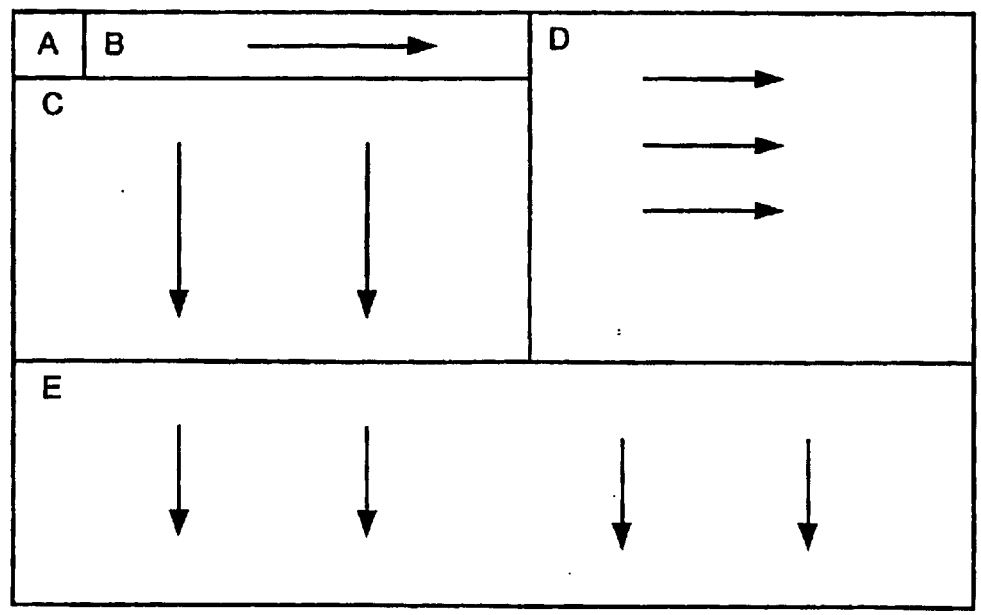

In FIG. 11D, the user has indicated that window C should be expanded. In response, window D has been added. Window D extends from the group ABC along a horizontal axis that is orthogonal to the previous expansion axis. When window D is expanded, window E is then added along the next orthogonal axis (vertical). Note that there is no intrinsic limit to the number of times a series of windows can be expanded, assuming that a sufficient number of windows have been defined for the series of expanding windows. As described, any added windows do not overlap the current window. They merely appear alongside the initial window groupings. Note that in this example, windows are expanded on alternating axes. Moreover, each added window is the full length/height of the existing window group.

Contract/removal of a window, such as window E in FIG. 11D, is done along the axis that was used when the window was added during expansion. Thus, window E would contract back into the ABCD group along the vertical axis. Window D would contract into the ABC group along the horizontal axis, and so on.

Figure 12A:
FIGS. 12A–12C show another example of a simple foldable window.
Figure 12B:
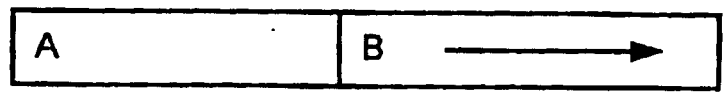
Figure 12C:
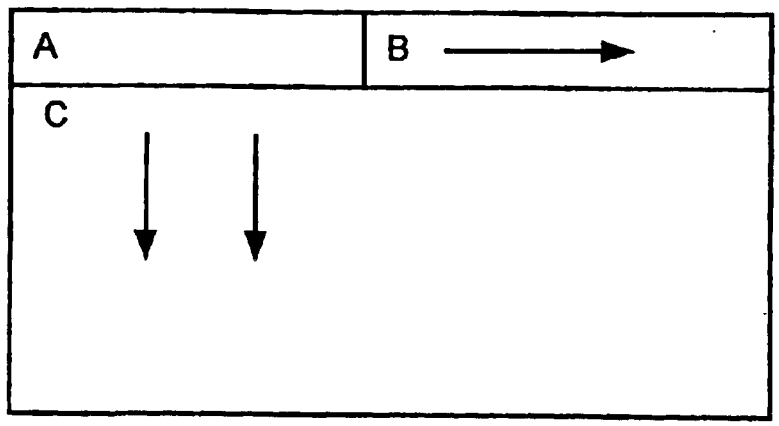

FIGS. 12A–12C show another example of a simple foldable window. In the example of FIGS. 12A–C, window A has a different shape than the window A of FIG. 11A. This example serves to illustrate the principle that the shape of a window preferably does not determine how it is expanded.

FIGS. 13A–13B show an example of a window that is first expanded in a horizontal direction to yield a window B. FIGS. 14A–14B show an example of a window that is first expanded in a vertical direction to yield a second window B. This example illustrates that windows can be expanded in any predetermined first direction. The first direction can also be direction not shown in the figure, such as up, left, or at an angle.

ii) Space-constrained Foldable Windows

Space-constrained mode is used when, for example, there is a possibility that the size of the open windows will exceed a predetermined area and such an occurrence is undesirable. This mode may involve some alteration to the alternating vertical/horizontal axis of addition used in the simple mode. In general, after a predetermined number n of windows has been displayed, additional windows are added in such a way that the remainder of the windows will fit in twice the space of the n windows. Thus, once the space constraint is reached, the n+1 window and subsequent windows (or, alternatively, all of the windows) may need to be resized to fit within the constrained space.

Figure 15:
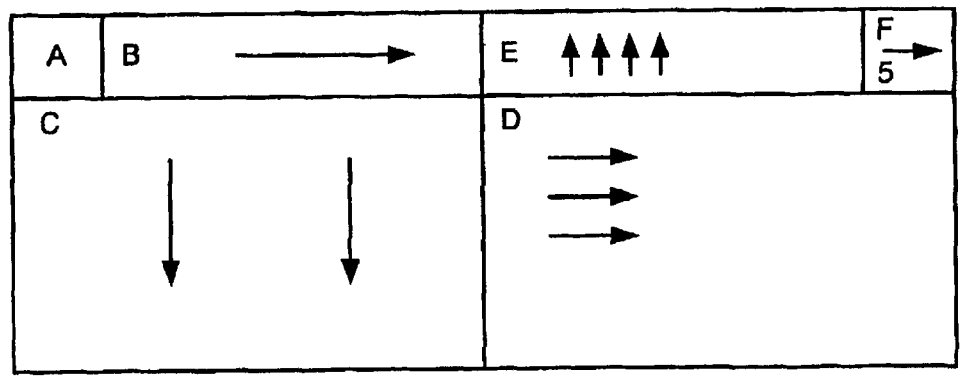
FIG. 15 shows an example of a window that is expanded in space-constrained mode.

FIG. 15 shows an example of a window that is expanded in space-constrained mode. In the example, n=3. Thus, after 3 windows (ABC) have been added, additional windows are added in such a way that they fit in the same area as windows ABC. Thus, windows ABC occupy the same space as windows DEF. Initially, window D was the same size as combined windows ABC. When window E was added, window D was shrunk and window E placed on top of window D, so that windows D and E had the same length (the default heights of the windows were predetermined). When window F was added, window E was shortened and window F took part of its space. If, in the example, window F is expanded, window D will be shrunk more and new window G will be placed atop windows E and F. Space-constrained window mode preferably has a predetermined maximum number of expansions that can take place. Certain embodiments may impose a top number of windows or a top number of certain types of windows that can be expanded in a given space.

Note that, in space-constrained window mode, expansions still alternate in horizontal/vertical directions, but expansions of the windows greater than n expand vertically upward instead of vertically downward. In other embodiments, the horizontal expansions may also be reversed in direction. As will be apparent, there are a number of ways that expansions can be implemented while still meetings the requirements of space-constrained mode. The implementation shown here is not to be taken in a limiting sense.

iii) Free Form Foldable Windows

In free form mode, the axis of addition is further altered from the simple model of alternating axes. Added windows can be of any length and height. Furthermore, there is not limitation of the amount of space used to expand the windows (a scroll bar may need to be implemented in order to allow the user to view all of the windows).

Figure 16:
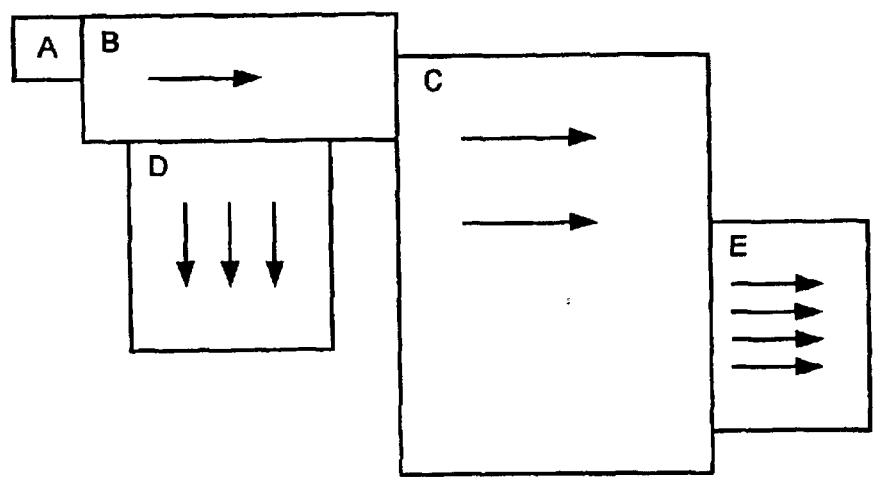
FIG. 16 shows an example of a window that is expanded in free-form mode.

FIG. 16 shows an example of a window that is expanded in free-form mode. In the example, each window has an associated direction of expansion and an associated description (or identification) of the window into which it expands. Thus, stored in association with window A is a direction of expansion of horizontal right, and an identifier of window B. Stored in association with window B is a direction of expansion of horizontal right and an identifier of window C. Stored in association with window C is a direction of expansion of vertical down and an identifier of window D (which includes the placement of D since it is non-contiguous). Stored in association with window D is a direction of expansion of horizontal right and an identifier of window E (including the placement of window E). Thus, in free form mode, windows do not necessarily expand into windows that are contiguous and alternation of axes is not a strict rule. Free form foldable windows can be of any size and shape.

iv) Expansion/Contraction of Groups of Foldable Windows

With any of the above-described foldable windows techniques groups of one or more windows can be treated as a group. Thus, at each step, one or more than one window can be added when a single window is expanded. Similarly, windows can be added or removed as groups or as single windows. Certain embodiments include user interfaces (see, e.g., FIG. 7) that allow the user to do either, at the user's choosing.

Figure 17:
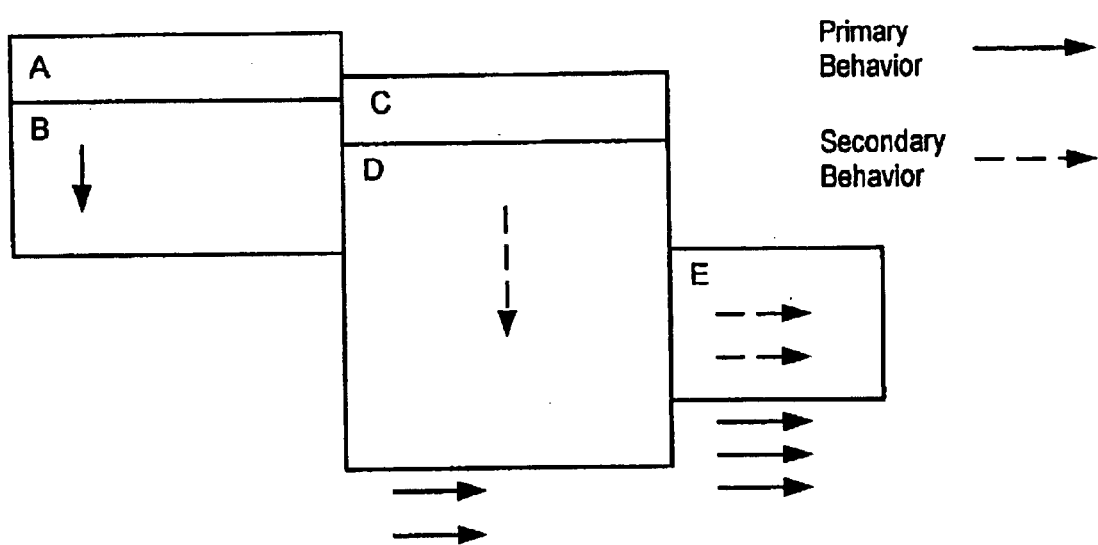
FIG. 17 shows an example where windows are expanded and contracted in groups

FIG. 17 shows an example where windows are expanded in groups of one or more. In the example (as shown by the solid lines in the figure), window group B emerges from window group A. Window group CD emerges from window group AB. Window group E emerges from window group ABCD. FIG. 17 also shows an example in which window groups have secondary behavior (as shown by dotted lines in the figure). Assuming that the proper user interface controls exist, a user can contract window group E into group CD. Secondary behavior of window D indicates that it will contract into window C. Alternately, the whole group of CDE can emerge and be retracted into AB.

A further example of group secondary behavior can be envisioned if one assumes that all user control/contraction arrows 524, 629, 730 of FIG. 7 are active at all times. If a user clicks on up arrow 730, window 701 would close. If, instead, a user clicks on left-pointing arrow 629, windows 601 and 701 would close. If, instead, the user clicks on up arrow 524, windows 520, 601, and 701 would close. Thus, it is possible in the example for the user to contract a group of windows with one user action, instead of contracting each individually. Any appropriate secondary behaviors can be defined in group mode, as long as appropriate user interface controls are included to indicate to the user that he can expand and contract windows as groups.

FIG. 18 shows an example data structure, in the C++ programming language, of a foldable window for non-space-constrained mode. The data structure for one folding window is identical to the window structure required by the target OS (here, for example, Microsoft Windows). It is not until these windows are grouped in a series that we have to worry about tracking extra data. That data is preferably illustrated using a vector of structures corresponding to each window. For example, in Microsoft Windows, each window's own data structure can be accessed using a Window handle, these handles could then be grouped with additional data and linked to parent and child windows such that the entirety of a folding windows set could be traversed from beginning to end. The described embodiment includes a programming class called 'Folding Window Manager', instances of which manage each unique set of related folding windows as described herein.

In the structure of FIG. 18, the window handles correspond to the handles of the Window being tracked (hwndFoldWin) and its parent (hwndParent, the window it 'unfolded' from), respectively. The direction variable would store a value such as 'ne', 's', 'w', etc. representing the compass point from which it emerges from the parent. The top and left variables represent the coordinates of the top, left hand corner of the window, relative to its parent. The remainder of the variables include the width, height, maximum width, maximum height, minimum width, and minimum height of the window.

In space-constrained mode, window sizing would be the responsibility of the Manager object, since changing the size to fit within the constrained space applies to the entire set of folding windows.

Accordingly, the present invention is intended to embrace all such alternatives, modifications and variations as fall within the spirit and scope of the appended claims and equivalents.

We claim:

1. In a computer system including a user interface and a persistent storage mechanism, a computer implemented method for coding and formatting a user-selected set of data in electronic format, the method comprising:

receiving the set of data from an external source;

capturing the received set of data, without opening a new program view within the user interface, onto a data target icon that operates independently from any concurrently active program and appears in the user interface concurrently with an open program view of said concurrently active program while allowing the user to concurrently work with said concurrently active program;

populating a gem data object field for inserting the captured set of data therein to code and format the captured set of data so as to create a gem data object containing the captured set of data, and coding and formatting information of the captured set of data; and viewing the captured set of data by expanding the data target icon into at least one window containing information relating to the captured set of data.

2. The method of claim 1, wherein the viewing step includes expanding the data target icon into a toolbar window having an area relating to viewing the gem data object.

3. The method of claim 2, wherein the viewing step further includes viewing the captured set of data by expanding the toolbar window into a gem view window showing a hierarchy of a plurality of gem data objects including the gem data object which contains the captured data.

4. The method of claim 3, wherein items in the gem view window are selectively expanded to show contents of one or more of the gem data objects.

5. The method of claim 3, wherein the viewing step further includes viewing the coding and formatting information of the captured set of data by expanding the gem view window into a gem information window.

6. The method of claim 2, wherein the viewing step includes clicking on an arrow in the toolbar window to expand or close the toolbar window.

7. The method of claim 1, wherein the external source is at least one of a user entry, a scanner, a website, a server, a database, a palm-top device, an audio device, an visual device.

8. The method of claim 1, further comprising: editing the viewed set of data in said window, and incorporating a time of the editing step into the gem data object.

9. The method of claim 1, wherein the data target icon floats on top of any open windows and maintains visible in the user interface.

10. The method of claim 1, further comprising a step of coding and installing a new module to receive data of a new type or format.

11. The method of claim 1, wherein the capturing step allows the user to selectively capture a portion of the received set of data onto the data target icon without opening a new program view within the user interface.

12. In a computer system including a user interface and a persistent storage mechanism, a computer implemented method for coding and formatting a user-selected set of data in electronic format, the method comprising:

capturing the set of data, without opening a new program view within the user interface, onto a data target icon that operates independently from any concurrently active program and appears in the user interface concurrently with an open program view of said concurrently active program while allowing the user to concurrently work with said concurrently active program;

populating a gem data object field for inserting the captured set of data therein to code and format the captured set of data so as to create a gem data object containing the captured set of data, and coding and formatting information of the captured set of data;

displaying one or more gem data objects including the gem data object in a window containing coding and formatting information of the captured set of data and a second icon; and contracting the window to the data target icon in response to a user indication to contract the window.

13. The method of claim 12, wherein the user indication is a double click action on the second icon displayed in the window.

14. The method of claim 12, wherein the data target icon is always displayed on top of any open windows and freely moveable in the user interface.

15. The method of claim 12, wherein the data target icon floats on top of any open windows and maintains visible in the user interface.

16. The method of claim 12, further comprising a step of coding and installing a new module to receive data of a new type or format.

17. The method of claim 12, wherein the capturing step allows the user to selectively capture a portion of the received set of data onto the data target icon without opening a new program view within the user interface.

* * * * *